US011178658B2

(12) United States Patent
Lee et al.

(10) Patent No.: US 11,178,658 B2
(45) Date of Patent: Nov. 16, 2021

(54) METHOD AND APPARATUS FOR TRANSMITTING AND RECEIVING CONTROL INFORMATION FOR SIDELINK COMMUNICATION IN WIRELESS COMMUNICATION SYSTEM

(71) Applicant: LG ELECTRONICS INC., Seoul (KR)

(72) Inventors: Seungmin Lee, Seoul (KR); Hanbyul Seo, Seoul (KR); Daesung Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/888,587

(22) Filed: May 29, 2020

(65) Prior Publication Data

US 2020/0314822 A1   Oct. 1, 2020

Related U.S. Application Data

(63) Continuation of application No. PCT/KR2020/004385, filed on Mar. 30, 2020.
(Continued)

(30) Foreign Application Priority Data

Mar. 29, 2019   (KR) .................. 10-2019-0037466

(51) Int. Cl.
*H04W 72/04* (2009.01)
*H04W 72/12* (2009.01)

(52) U.S. Cl.
CPC ......... *H04W 72/042* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 2012/0009923 A1* | 1/2012 | Chen | H04L 5/0053 455/434 |
| 2018/0115966 A1 | 4/2018 | Chen et al. | |

(Continued)

FOREIGN PATENT DOCUMENTS

KR   20190008387   1/2019

OTHER PUBLICATIONS

PCT International Application No. PCT/KR2020/004385, International Search Report dated Jul. 6, 2020, 3 pages.
(Continued)

*Primary Examiner* — Jenkey Van
(74) *Attorney, Agent, or Firm* — Lee, Hong, Degerman, Kang & Waimey

(57) ABSTRACT

Proposed is a method of performing wireless communication by a first apparatus. The method may include receiving first control information on a first search space related to the first control information, and receiving second control information on a second search space related to the second control information. For example, the first search space related to the first control information may overlap with the second search space related to the second control information, based on that a base station allocates a resource related to sidelink transmission to the first apparatus in a carrier in which Uu communication is performed.

15 Claims, 20 Drawing Sheets

Related U.S. Application Data

(60) Provisional application No. 62/938,885, filed on Nov. 21, 2019, provisional application No. 62/888,424, filed on Aug. 16, 2019, provisional application No. 62/888,365, filed on Aug. 16, 2019.

(56) References Cited

U.S. PATENT DOCUMENTS

| | | | |
|---|---|---|---|
| 2018/0152954 A1 | 5/2018 | Elbwart et al. | |
| 2019/0021045 A1* | 1/2019 | Kim | H04W 72/042 |
| 2019/0082431 A1* | 3/2019 | Yl | H04L 5/0055 |
| 2019/0191424 A1* | 6/2019 | Wang | H04L 5/005 |
| 2019/0261405 A1* | 8/2019 | Ang | H04W 72/0453 |
| 2019/0274032 A1* | 9/2019 | Chatterjee | H04W 48/12 |
| 2019/0297604 A1* | 9/2019 | Lee | H04W 72/1268 |
| 2019/0342907 A1* | 11/2019 | Huang | H04L 5/0048 |
| 2019/0357262 A1* | 11/2019 | Cirik | H04W 76/11 |
| 2021/0028891 A1* | 1/2021 | Zhou | H04L 5/0055 |

OTHER PUBLICATIONS

Ericsson, "Maintenance issues of physical downlink control channel," 3GPP TSG-RAN WG1 Meeting #95, R1-1813470, Spokane, USA, Nov. 12-16, 2018, 12 pages.

Huawei et al., "Remaining issues of physical downlink control channel," 3GPP TSG RAN WG1 Meeting #95, R1-1812181, Spokane, USA, Nov. 12-16, 2018, 17 pages.

* cited by examiner

FIG. 4
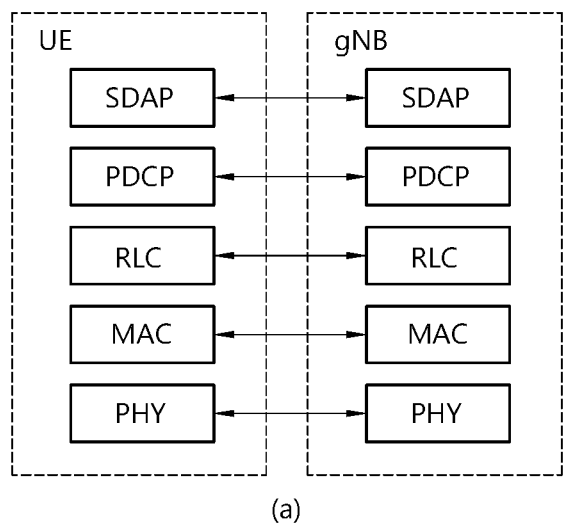
(a)
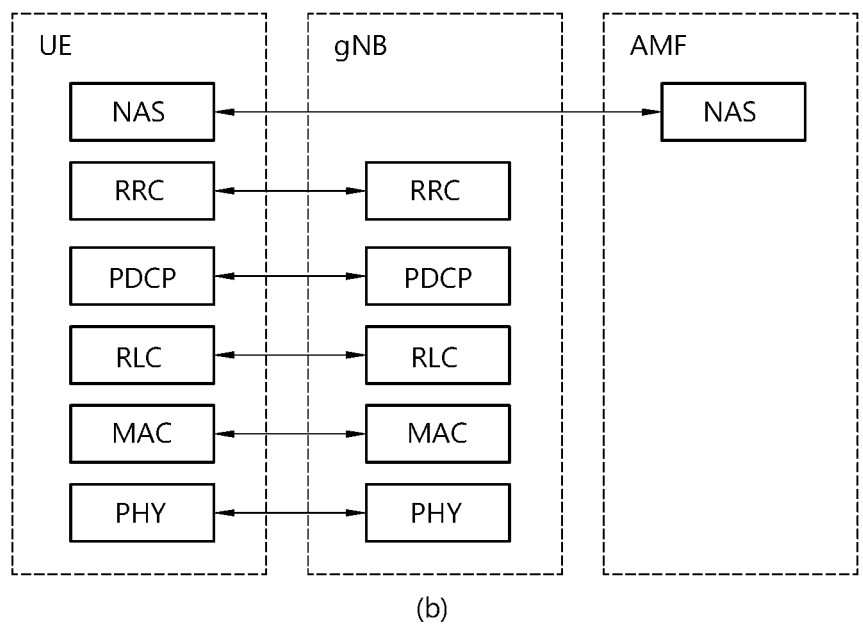
(b)

FIG. 8
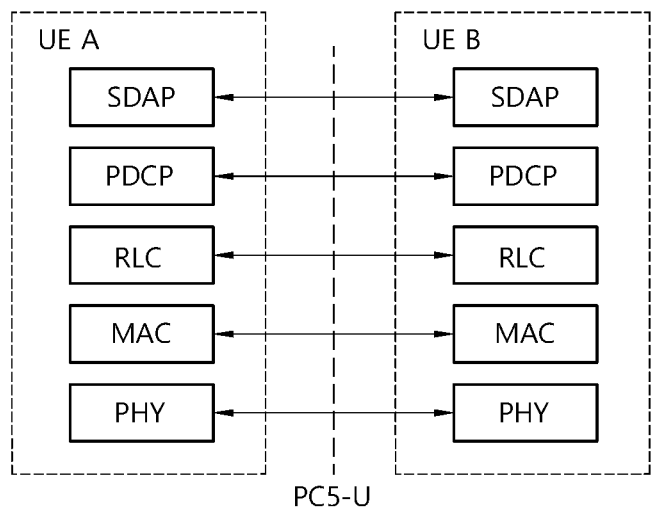
(a)
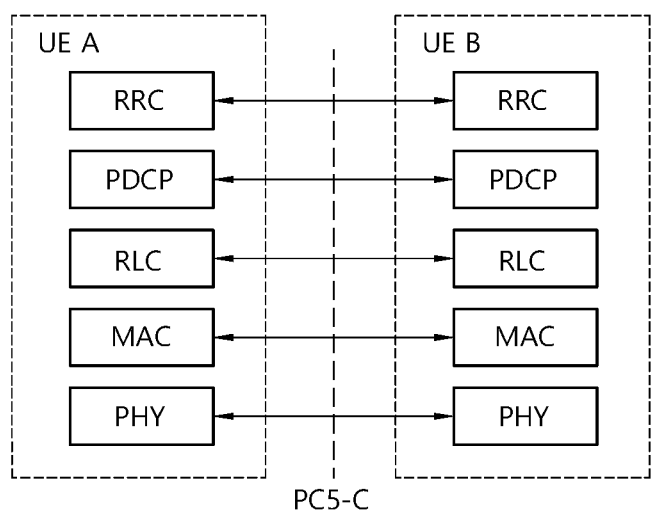
(b)

METHOD AND APPARATUS FOR TRANSMITTING AND RECEIVING CONTROL INFORMATION FOR SIDELINK COMMUNICATION IN WIRELESS COMMUNICATION SYSTEM

CROSS-REFERENCE TO RELATED APPLICATIONS

This application is a continuation of International Application No. PCT/KR2020/004385, filed on Mar. 30, 2020, which claims the benefit of U.S. Provisional Application Nos. 62/888,365, filed on Aug. 16, 2019, 62/888,424, filed on Aug. 16, 2019, and 62/938,885, filed on Nov. 21, 2019, and also claims the benefit of earlier filing date and right of priority to Korean Patent Application No. 10-2019-0037466, filed on Mar. 29, 2019, the contents of which are all hereby incorporated by reference herein in their entirety.

BACKGROUND

Field

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY

Meanwhile, in a wireless communication system, when a user equipment (UE) operates in an NR sidelink resource allocation mode 1, a base station (BS) may transmit information related to NR sidelink transmission to the UE in the form of downlink control information (DCI) through a physical downlink control channel (PDCCH). In addition, the UE may acquire the DCI transmitted through the PDCCH by performing decoding (e.g., blind decoding) on a set of PDCCH candidates received through a Uu link or interface. The set of PDCCH candidates decoded by the UE may be defined as a PDCCH search space set. The search space set may be a common search space or a UE-specific search space. In this case, a configuration between a search space for sidelink DCI monitoring and a search space for Uu DCI monitoring may be required.

In an embodiment, there is provided a method of performing wireless communication by a first apparatus. The method may include receiving first control information on a first search space related to the first control information, and receiving second control information on a second search space related to the second control information. For example, the first search space related to the first control information may overlap with the second search space related to the second control information, based on that a BS allocates a resource related to sidelink transmission to the first apparatus in a carrier in which Uu communication is performed. For example, the first control information may include control information for scheduling a resource related to Uu communication. For example, the second control information may include control information for scheduling performed by the BS for a resource related to sidelink transmission of the first apparatus.

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

DESCRIPTION OF EXEMPLARY EMBODIMENTS

Figure 1:
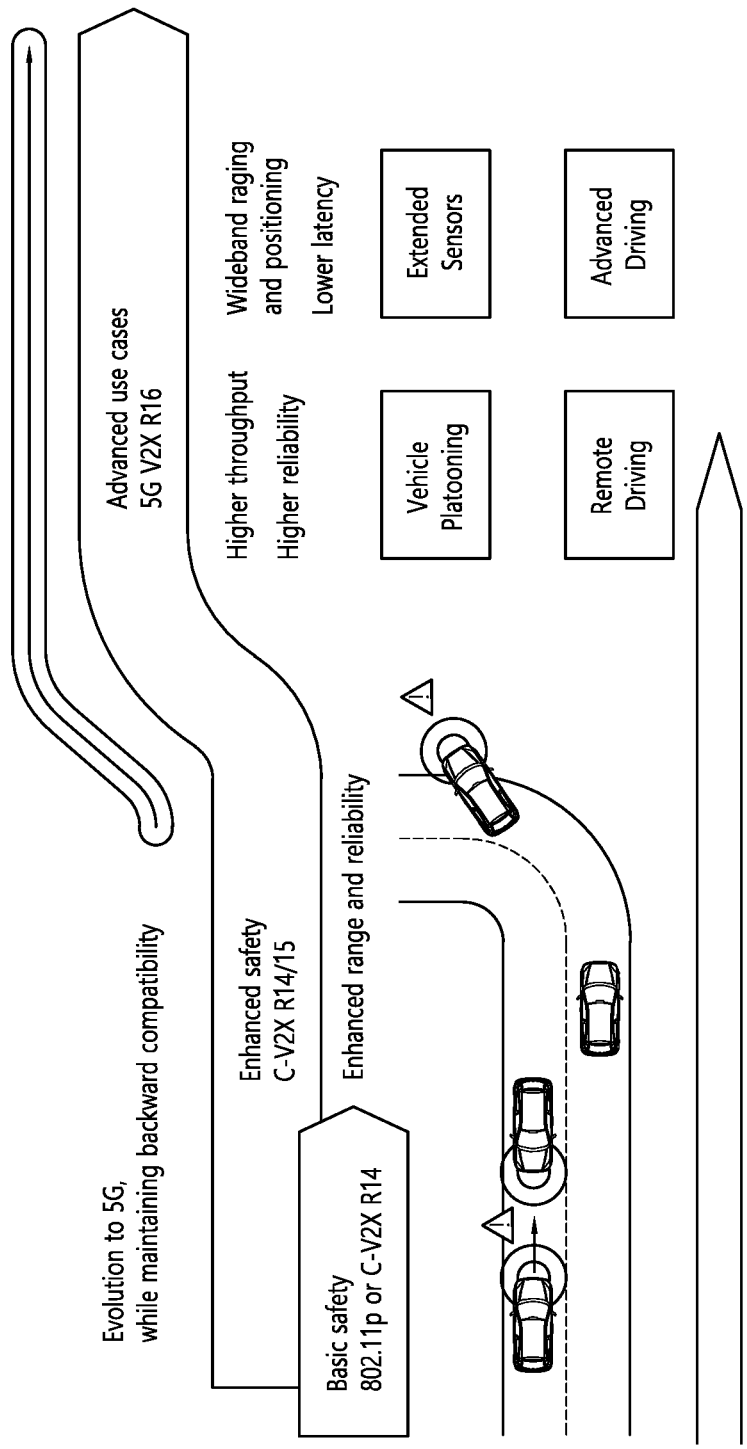
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
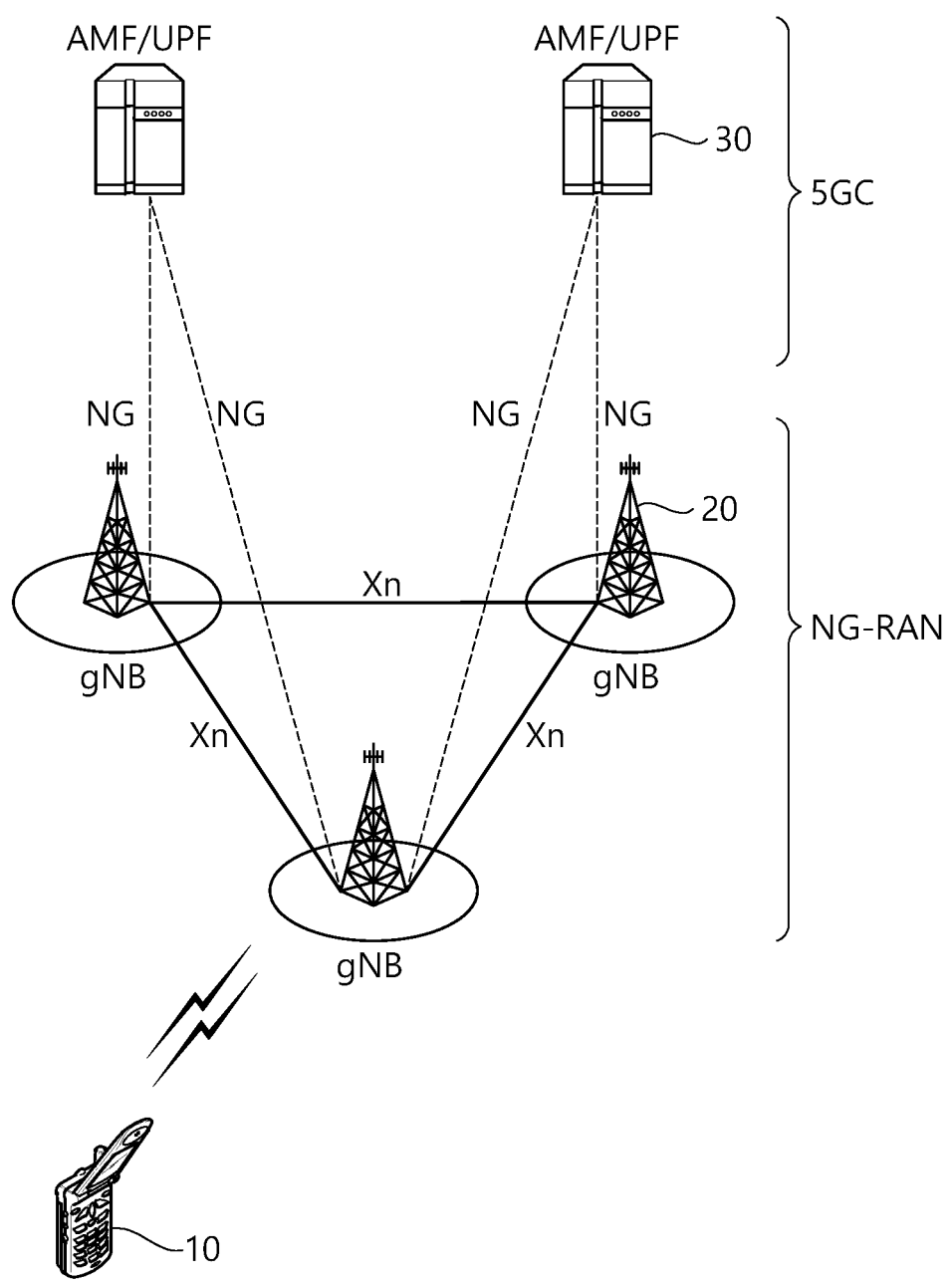
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
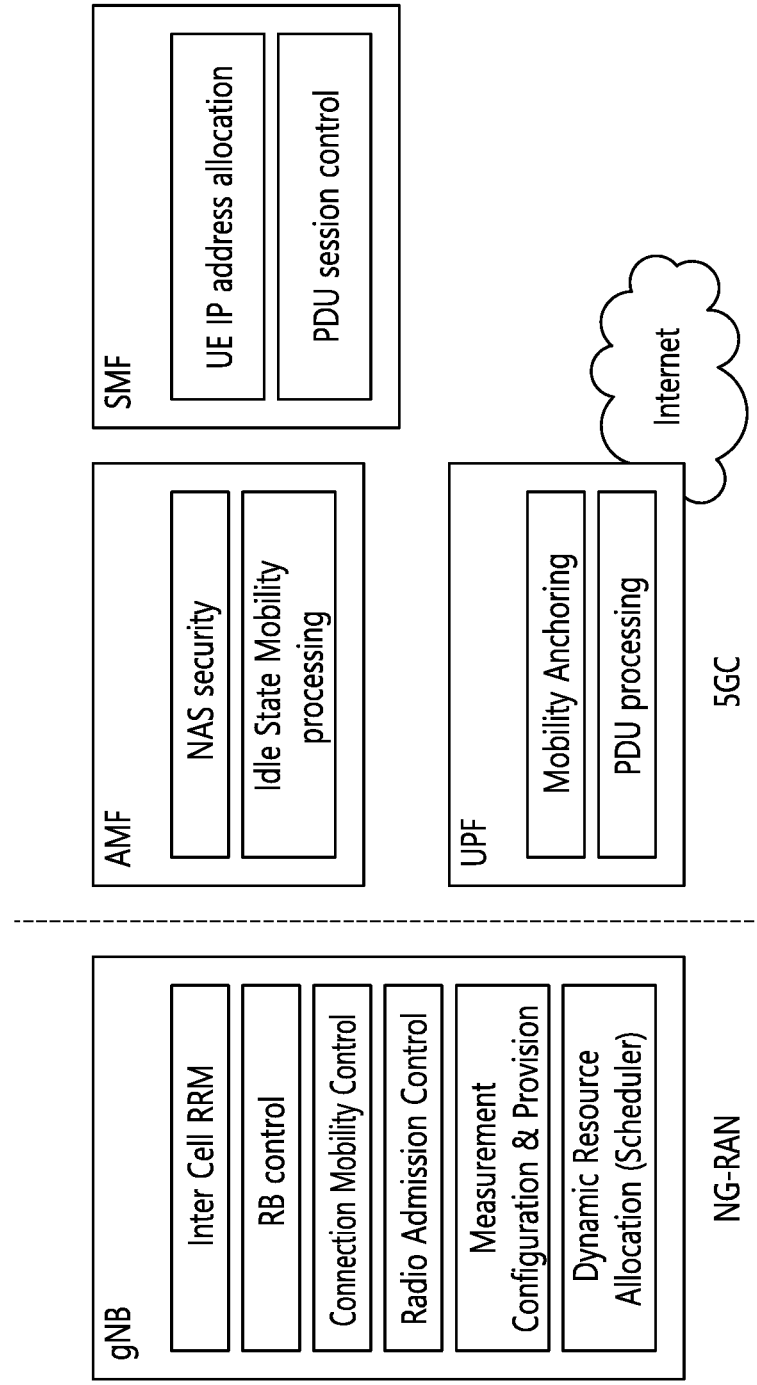
FIG. 3 shows a functional division between an NG-RAN and a SGC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
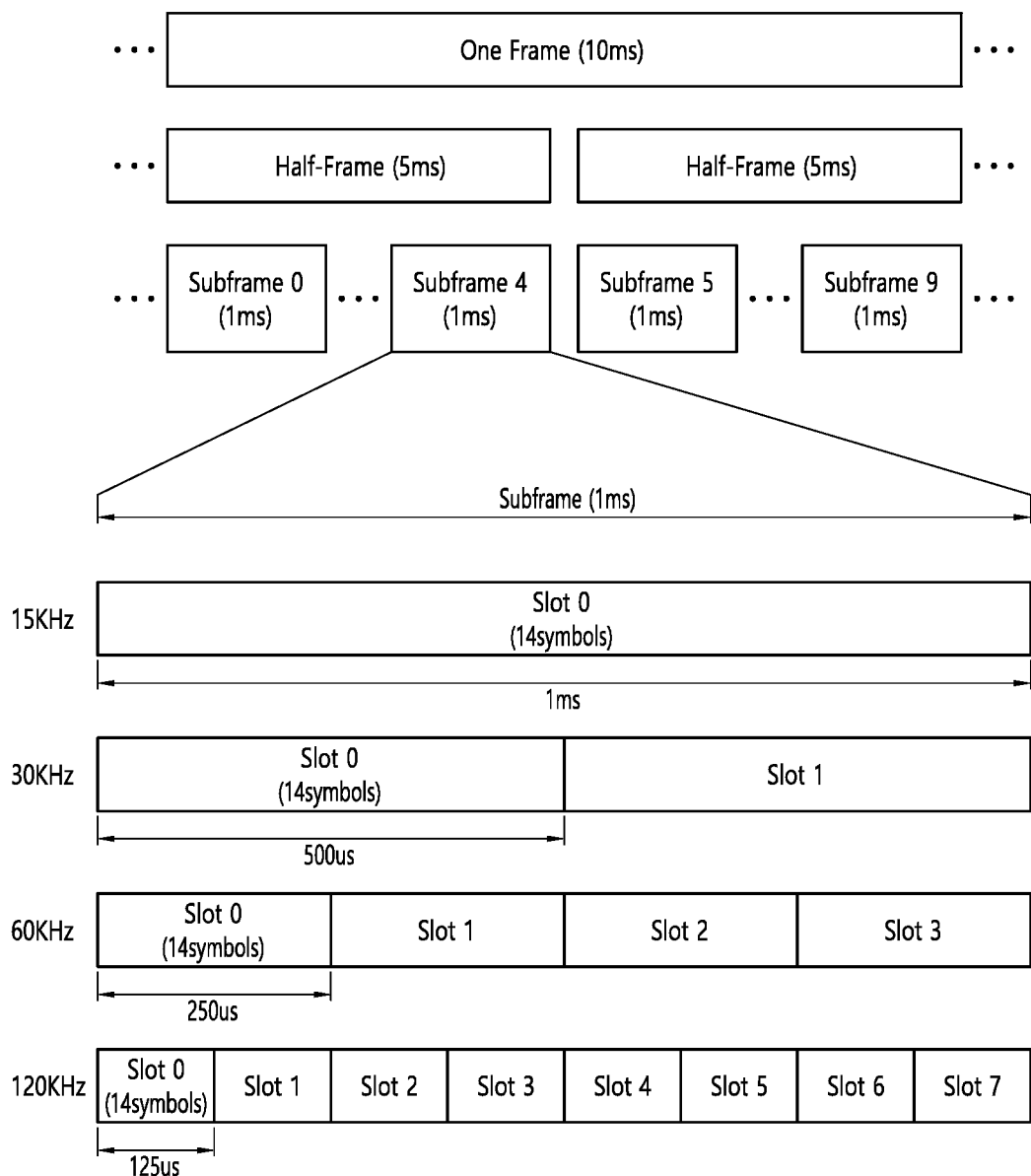
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells. In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
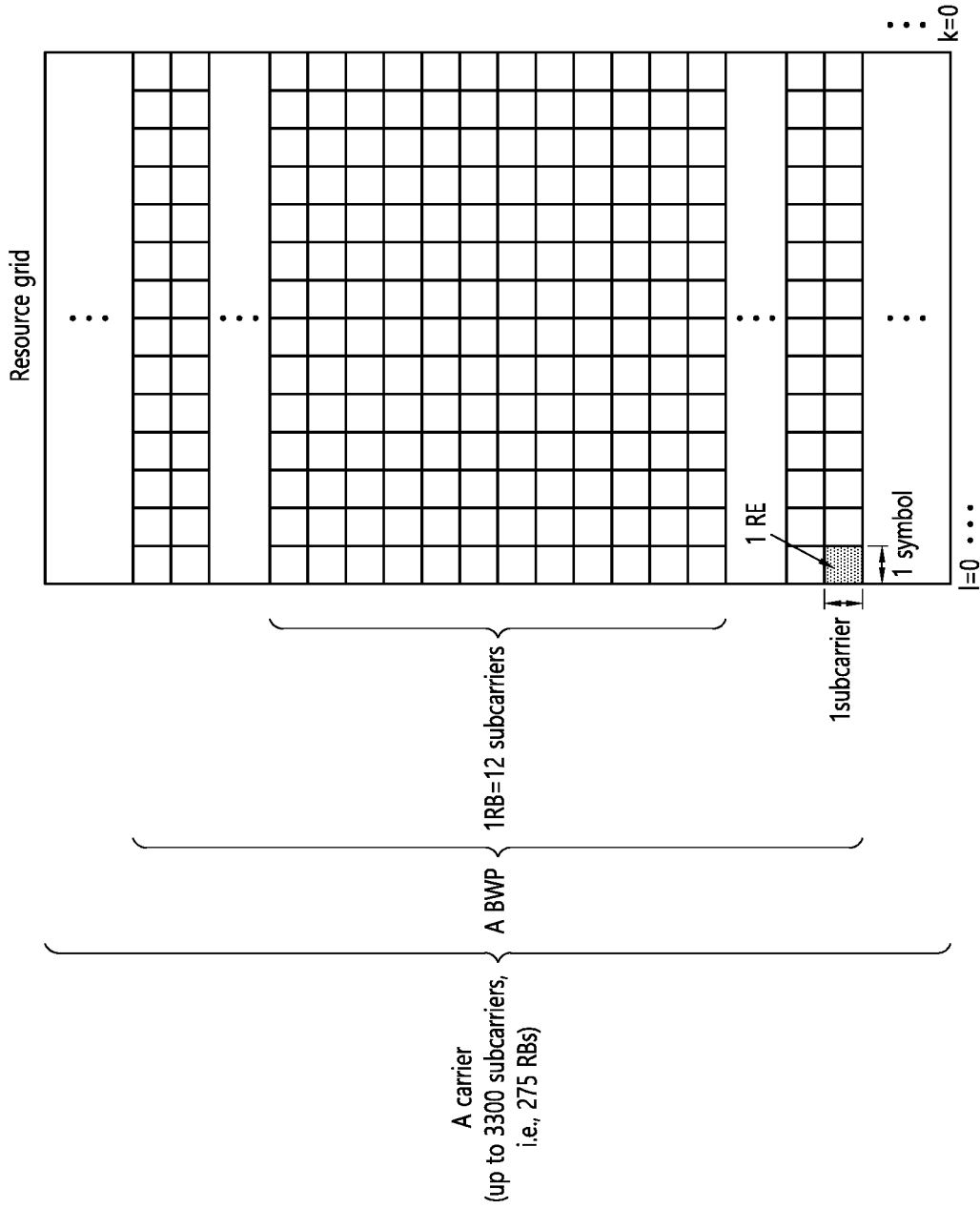
FIG. 6 shows a structure of a slot of an NR frame, in accordance with an embodiment of the present disclosure.

FIG. 6 shows a structure of a slot of an NR frame, in accordance with an embodiment of the present disclosure. Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
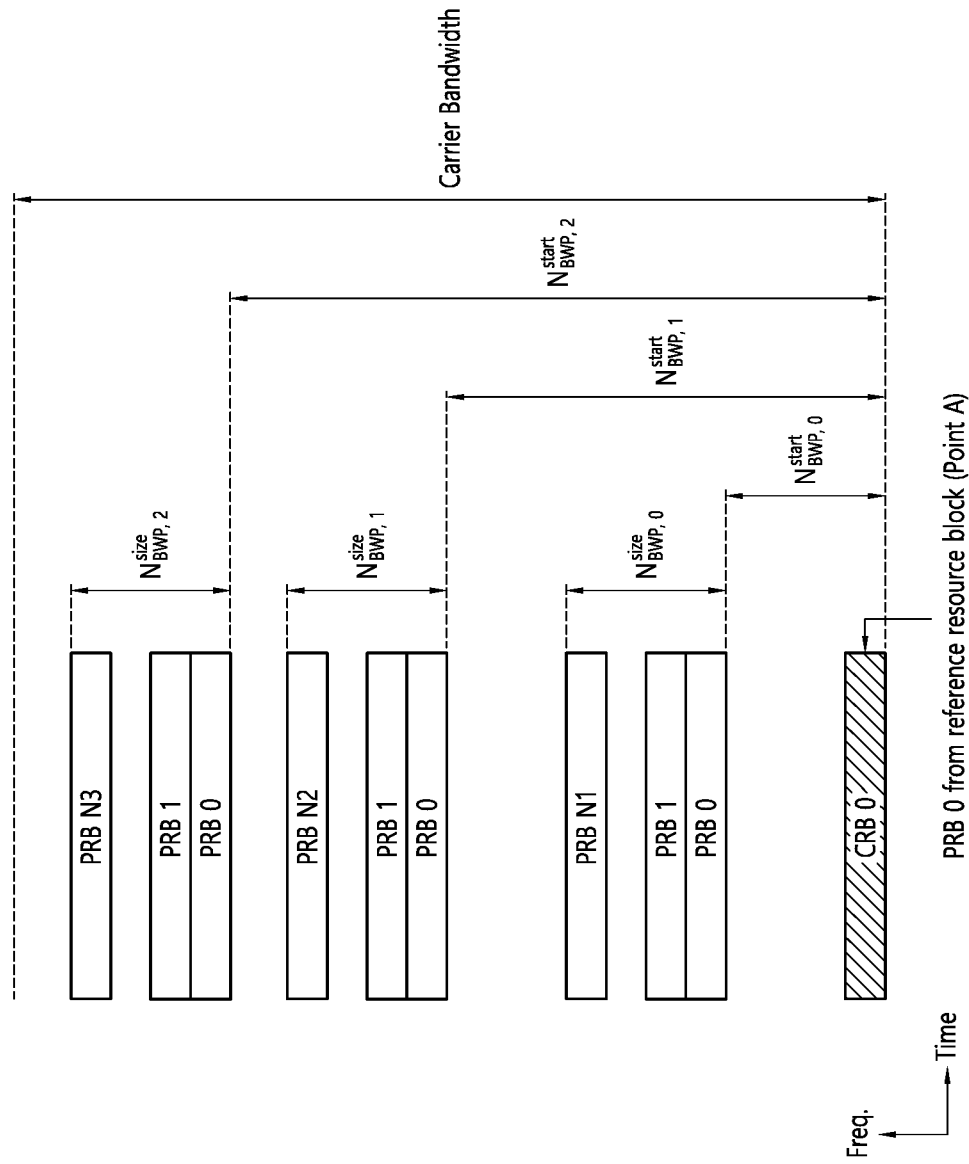
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
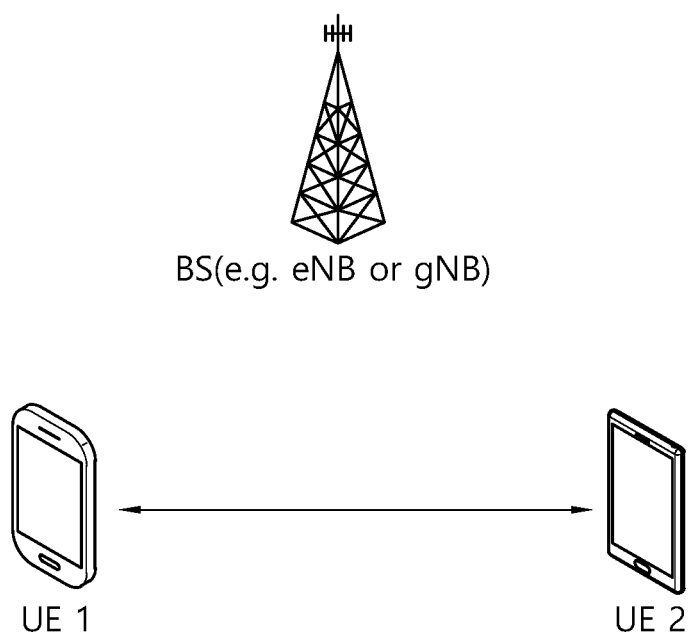
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
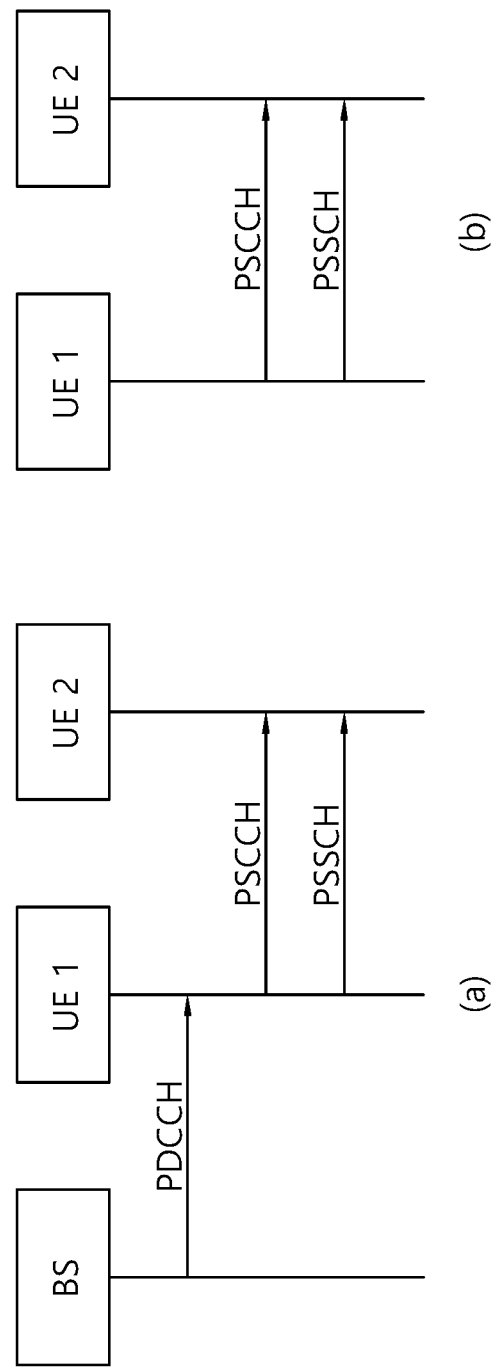
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
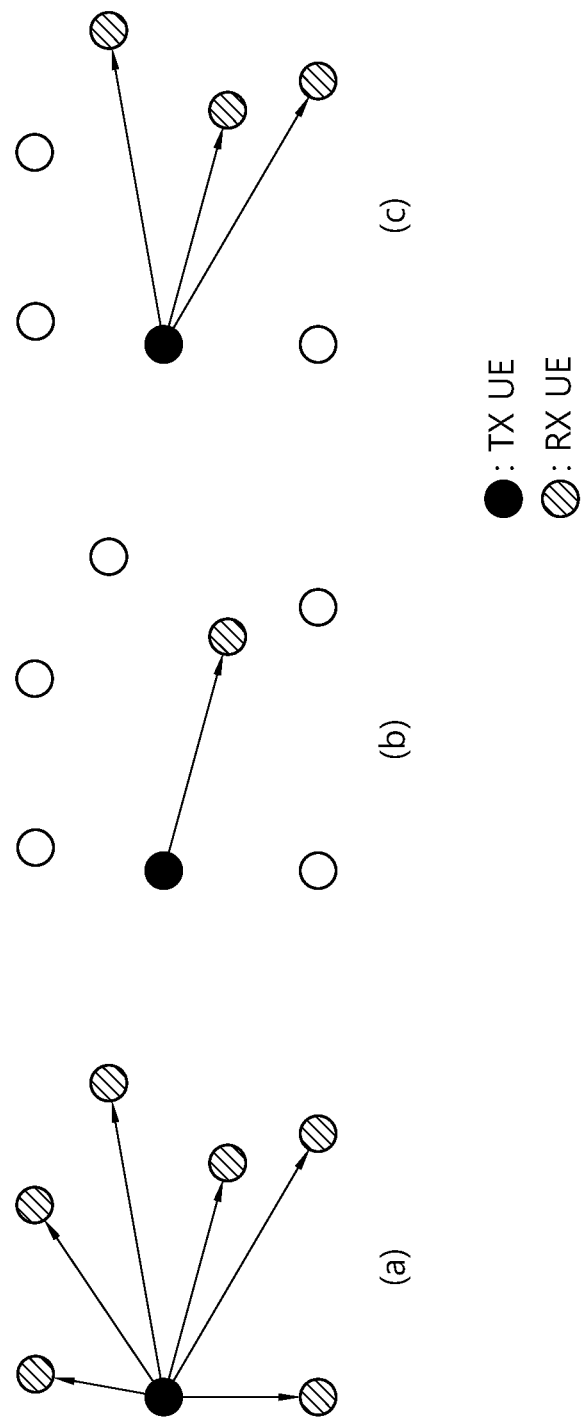
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, various use cases may be supported in a next-generation communication system. For example, a service for communication such as an autonomous vehicle, a smart car, a connected car, or the like may be considered. For such a service, each vehicle may exchange information as a UE capable of communication, may select a resource for communication with or without the assistance of a BS according to a situation, and may exchange a message between UEs.

Meanwhile, in the next-generation communication system, the BS may transmit information related to sidelink transmission to the UE through a Uu link or interface. In this case, the UE may operate in an NR sidelink resource allocation mode 1. When the UE operates in the NR sidelink resource allocation mode 1, the BS may transmit information related to NR sidelink transmission to the UE in the form of a downlink control information (DCI) through a physical downlink control channel (PDCCH).

The PDCCH may carry downlink control information, and a quadrature phase shift keying (QPSK) modulation scheme may be applied. One PDCCH may consist of 1, 2, 4, 8, and 16 control channel elements (CCEs) according to an aggregation level (AL). One CCE may consist of 6 resource element groups (REGs). One REG may be defined as one OFDM symbol and one resource block (RB) or physical resource block (PRB). The PDCCH may be transmitted through a control resource set (hereinafter, CORESET). The CORESET may be defined as an REG set having a given numerology (e.g., subcarrier spacing, cyclic prefix length, etc.). For example, a plurality of CORESETs for one UE may overlap in a time/frequency domain. The CORESET may be configured through system information (e.g., master information block (MIB)) or UE-specific higher layer (e.g., radio resource control (RRC) layer) signaling. Specifically, for example, the number of RBs and the number of symbols (maximum 3) constituting the CORESET may be configured by higher layer signaling. The number of CORESETs that can be allocated to the UE may be limited by considering complexity. For example, up to 3 CORESETs may be configured for the UE.

The UE may acquire the DCI transmitted through the PDCCH by performing decoding (e.g., blind decoding) on a set of PDCCH candidates received through the Uu link or interface. The set of PDCCH candidates decoded by the UE may be defined as a PDCCH search space set. The search space set may be a common search space or a UE-specific search space. The UE may acquire the DCI by monitoring a PDCCH candidate in one or more search space sets configured by MIB or higher layer signaling. Each CORESET configuration may be associated with one or more search space sets, and each search space set may be associated with one CORESET configuration. For example, one search space set may be determined based on the following parameters.

controlResourceSetId: control resource set associated with search space set
monitoringSlotPeriodicityAndOffset: PDCCH monitoring period duration (slot unit) and PDCCH monitoring duration offset (slot unit)
monitoringSymbolsWithinSlot: PDCCH monitoring pattern in slot for PDCCH monitoring (e.g., first symbol(s) of control resource set)
nrofCandidates: The number of PDCCH candidates per AL={1, 2, 4, 8, 16} (one value selected from 0, 1, 2, 3, 4, 5, 6, 8)

Table 6 below exemplifies a feature per search space type.

TABLE 6

| Type | Search Space | RNTI (Radio Network Temporary Identifier) | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 7 below exemplifies DCI formats transmitted through a PDCCH.

TABLE 7

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

Referring to Table 7, a DCI format 0_0 may be used to schedule a TB(transport)-based (or TB-level) PUSCH, and a DCI format 0_1 may be used to schedule a TB-based (or TB-level) PUSCH or CBG(Code Block Group)-based (or CBG-level) PUSCH. A DCI format 1_0 may be used to schedule a TB-based (or TB-level) PDSCH, and a DCI format 1_1 may be used to schedule a TB-based (or TB-level) PDSCH or CBG-based (or CBG-level) PDSCH. A DCI format 2_0 may be used to transfer dynamic slot format information (e.g., dynamic SFI(slot format indicator)) to the UE, and a DCI format 2_1 may be used to transfer downlink pre-Emption information to the UE. The DCI format 2_0 and/or DCI format 2_1 may be transferred to UEs in a corresponding group through a group common PDCCH which is a PDCCH transferred to UEs defined as one group. For example, the UE may attempt detection of the DCI format 1_0 and the DCI format 0_0 by monitoring PDCCH candidates in a Type0-PDCCH/Type0A-PDCCH/Type1-PDCCH/Type2-PDCCH common search space. In addition, for example, the UE may attempt detection of the DCI format 2_0 and/or DCI format 2_1 and/or DCI format 2_2 and/or DCI format 2_3 and/or DCI format 1_0/0_0 by monitoring PDCCH candidates according to a configuration of the BS in a Type3-PDCCH common search space. Meanwhile, the UE may attempt detection of the DCI format 1_0/0_0 or the DCI format 1_1/0_1 by monitoring PDCCH candidates in a UE-specific search space.

A size of the DCI format transmitted through the Uu link or interface may be given or determined according to the following criterion. A size of the DCI format 1_0/0_0 detected in the common search space may be determined based on a size of a CORESET 0 in case of a cell in which a CORESET 0 is configured, and may be determined based on an initial downlink (DL) BWP in case of a cell in which the CORESET 0 is not configured. A size of the DCI format 1_1/0_1 may be determined based on an active DL BWP or an active UL BWP. A size of the DCI format 2_0/2_1 may be configured or determined through higher layer signaling. A size of the DCI format 2_2/2_3 may be determined to be equal to the size of the DCI format 1_0/0_0 detected in the common search space. When a DCI format size budget is satisfied, the size of the DCI format 1_0/0_0 detected in the UE-specific search space may be determined based on an active DL BWP or an active UL BWP, or may be determined based on the size of the CORESET 0 or the initial DL BWP. The DCI format size budget is defined to decrease UE implementation complexity. For example, it is assumed that a DCI format size corresponding to a cell-radio network temporary identifier (C-RNTI) is less than or equal to 3 for a specific cell, and the DCI format size is less than or equal to 4 without distinction of RNTI. In addition, for example, the size of the DCI format 1_0/0_0 detected in the UE-specific search space may be changed to achieve the DCI format size budget.

The UE may attempt detection of PDCCH candidates in all common search spaces. Otherwise, regarding UE-specific search spaces, whether the PDCCH candidates will be detected in unit of search spaces may be determined to satisfy the limitation of the maximum number of blind decoding attempts and/or the number of CCEs for channel estimation by considering UE complexity. That is, for example, the number of UE-specific search spaces for attempting detection of the PDCCH candidates may be determined within a range not exceeding the limitation. For example, the UE may not attempt PDCCH blind decoding from a UE-specific search space having a highest search space ID.

Hereinafter, a method of transmitting and receiving DCI for sidelink transmission and an apparatus supporting the method when a UE operates in an NR sidelink resource allocation mode 1 will be described according to various embodiments of the present disclosure.

Figure 12:
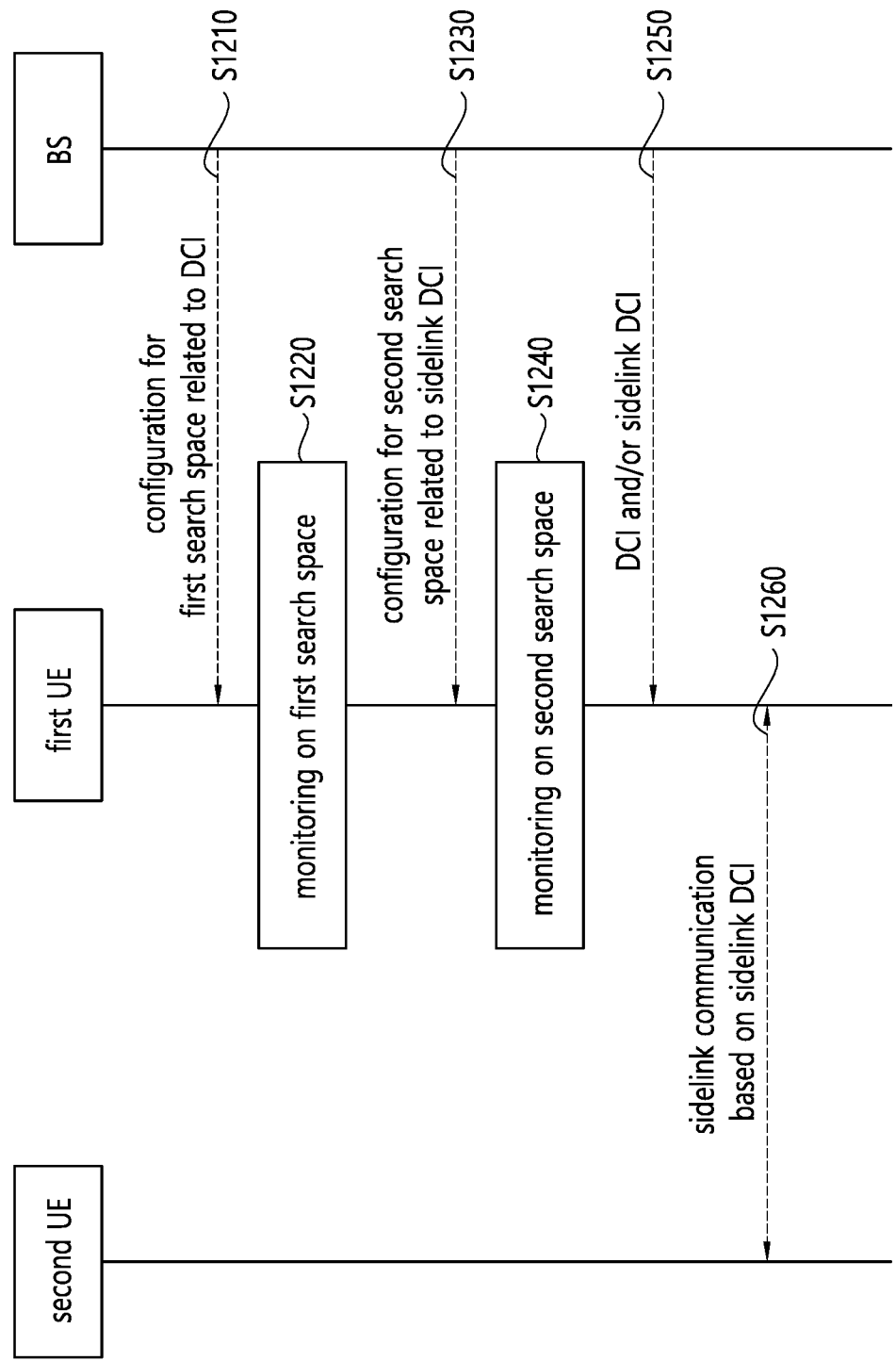
FIG. 12 shows a procedure of performing sidelink communication, based on downlink control information (DCI) received by a UE from a BS, according to an embodiment of the present disclosure.

FIG. 12 shows a procedure of performing sidelink communication, based on DCI received by a UE from a BS, according to an embodiment of the present disclosure. The embodiment of FIG. 12 may be combined with various embodiments of the present disclosure.

Referring to FIG. 12, in step S1210, a first UE may receive a configuration for a first search space related to DCI from a BS. For example, the first search space related to the DCI may be configured for the first UE. In step S1220, the first UE may perform monitoring on the DCI in the first search space related to the DCI. For example, the UE may detect the DCI through the monitoring in the first search space related to the DCI. For example, the UE may perform blind decoding on the first search space related to the DCI, and may acquire the DCI.

In step S1230, the first UE may receive a configuration for a second search space related to sidelink DCI from the BS. For example, the second search space related to the sidelink DCI may be configured for the first UE. In step S1240, the first UE may perform monitoring on the sidelink DCI in the second search space related to the sidelink DCI. For example, the first UE may detect the sidelink DCI through the monitoring in the second search space related to the sidelink DCI. For example, the first UE may perform blind decoding on the second search space related to the sidelink DCI, and may acquire the sidelink DCI.

In step S1250, the first UE may receive DCI and/or sidelink DCI from the BS. For example, a size of the DCI may be equal to a size of the sidelink DCI. For example, the size of the DCI and the size of the sidelink DCI may be determined to be equal to each other. In step S1260, the first UE may perform sidelink communication with respect to a second UE, based on the sidelink DCI.

According to an embodiment of the present disclosure, a UE may attempt detection of a DCI format for the sidelink transmission by monitoring a PDCCH candidate in one or more CORESETs and/or search spaces. In this case, each CORESET configuration may be associated with one or more search spaces, or each search space may be associated with one CORESET configuration. For example, the DCI format for the sidelink transmission may include information related to sidelink transmission. For example, the UE may perform sidelink communication with respect to another UE, based on sidelink transmission-related information included in the DCI format for the sidelink transmission. For example, the DCI format for the sidelink transmission may be defined as a DCI format 3_X or the like. In addition, for example, a plurality of DCI formats for the sidelink transmission may be defined.

According to an embodiment of the present disclosure, a search space for monitoring the sidelink DCI may be configured to overlap or not to overlap with a search space for monitoring Uu DCI. The following factors may be considered when the search space related to the sidelink DCI is configured.

1) The number of monitored PDCCHs (e.g., the number of monitored PDCCHs, less than or equal to a predetermined threshold)

2) The number of monitored and not overlapping CCEs

3) DCI size budget

For example, the total number of DCI sizes different from each other and configured for monitoring may not exceed 4 for a cell. In addition, for example, the total number of DCI sizes different from each other and configured for monitoring together with C-RNTI may not exceed 3 for the cell.

For example, when sidelink DCI is introduced on Uu DCI, all of the aforementioned three factors may be affected, and may exceed a predetermined maximum threshold. For example, regarding a DCI size budget, when an SL DCI search space is configured, an NR DCI size budget condition may have to be satisfied. That is, the NR DCI size budget may include a DCI size for SL scheduling. Therefore, for example, the existing NR DCI size budget may be maintained for an NR sidelink mode 1.

According to an embodiment of the present disclosure, for a sidelink operation in a licensed carrier, a search space related to sidelink DCI may be configured to completely overlap with a search space related to Uu DCI, thereby solving problems related to the aforementioned first and second factors. In addition, for example, sidelink DCI sizes may be matched to Uu DCI sizes in an overlapping search space, thereby solving a problem related to the last factor (e.g., the DCI size budget). Under these conditions (e.g., a condition in which the search space related to the sidelink DCI completely overlaps with the search space related to the Uu DCI and a condition in which the sidelink DCI sizes are matched to Uu DCI sizes in the overlapping search space), when an SL DCI search space in a license carrier is introduced, a problem related to blind decoding (BD)/CCE limitation and the DCI size budget may not occur. Therefore, for example, in case of a sidelink operation in a license carrier, one of search spaces related to Uu DCI may be used as a search space related to sidelink DCI. For example, a sidelink DCI size may be equal to one of Uu DCI sizes in a related search space.

According to an embodiment of the present disclosure, for a sidelink operation in a dedicated intelligent transport system (ITS) carrier, the search space related to the sidelink DCI may not overlap with the search space related to the Uu DCI. Alternatively, for example, for the sidelink operation in the dedicated ITS carrier, the search space related to the sidelink DCI may overlap with the search space related to the Uu DCI. For example, if the search space related to the sidelink DCI does not overlap with the search space related to the Uu DCI, an operation in which the UE monitors the DCI search space may stop when the number of monitored PDCCHs or CCEs exceeds a limitation. For example, one of solutions for minimizing the stop of the monitoring for the search space related to the sidelink DCI may be allocating of a low index to the search space related to the sidelink DCI. Through this method, an operation related to the sidelink DCI may be maintained relatively for long. For example, if the search space related to the sidelink DCI completely overlaps with the Uu DCI search space in a dedicated ITS carrier, an operation may be performed similarly to a case of the aforementioned licensed carrier in order to satisfy the DCI size budget. For example, if the number of DCI sizes exceeds the DCI size budget and there are two or more Uu DCI sizes greater than or equal to the sidelink DCI size, zero (0) may be filled to the sidelink DCI to fit the sidelink DCI size to the Uu DCI size. For example, if all Uu DCI sizes are less than the sidelink DCI size, size sorting may be necessarily performed between the sidelink DCI size and the Uu DCI size. In this case, several options may be taken into account. For example, a first method may be a method in which a sidelink DCI size is truncated to fit to a Uu DCI size. For example, a second method may be a method in which 0 is filled to Uu DCI to fit a Uu DCI size to a sidelink DCI size. For example, a third method may be a method in which a sidelink DCI size is configured such that DCI size sorting is always possible. For example, a fourth method may be a method in which a network allows a sidelink DCI size to be always less than or equal to a Uu DCI size. Therefore, for example, in case of a sidelink operation in an ITS carrier which is a cross-carrier scheduled by sidelink DCI in a licensed carrier, a search space related to the sidelink DCI may be configured to be independent of a search space related to Uu DCI. For example, if the search space related to the sidelink DCI overlaps with one of Uu DCI search spaces, size sorting may be performed between the sidelink DCI and the Uu DCI.

According to an embodiment of the present disclosure, a CORESET and/or search space for a DCI format (e.g., DCI format 3_X) for sidelink transmission may be additionally defined or configured. That is, the UE may attempt detection of the DCI format (e.g., DCI format 3_X) for the sidelink transmission in the additional defined or configured CORESET and/or search space.

Option 1: For example, it may be configured such that a DCI format (e.g., DCI format 3_X) is transmitted and/or detected in a Type3-PDCCH common search space. Specifically, for example, the UE may attempt detection of the DCI format 2_0 and/or DCI format 2_1 and/or DCI format 2_2 and/or DCI format 2_3 and/or DCI format (e.g., DCI format 3_X) for the sidelink transmission according to a configuration of a BS in the Type3-PDCCH common search space.

For example, a size of the DCI format (e.g., DCI format 3_X) for the sidelink transmission may be configured or determined through higher layer signaling (e.g., RRC signaling). For example, a size of the DCI format (e.g., DCI format 3_X) for the sidelink transmission may be configured based on a size of the CORESET 0 or a size of the initial DL BWP or may be determined or configured to be equal to the determined size of the DCI format 1_0/0_0. For example, a method of determining the size of the DCI format for the sidelink transmission may be configured or determined by the BS to satisfy/achieve a DCI format size budget from a perspective of the UE.

For example, in order to match the size of the DCI format to a size of a reference DCI format, if the size of the DCI format (e.g., DCI format 3_X) for the sidelink transmission is less than the size of the reference DCI format, the BS may add a padding bit. For example, the padding bit may be added in the form of zero padding. For example, when the DCI format size for the sidelink transmission is less than a pre-configured DCI format size, the BS may add the padding bit to DCI for the sidelink transmission.

Otherwise, in order to match the size of the DCI format to the size of the reference DCI format, if the size of the DCI format (e.g., DCI format 3_X) for the sidelink transmission is greater than the size of the reference DCI format, the BS may truncate a part of a DCI field. For example, the UE may perform zero padding on the truncated DCI field before interpreting the truncated DCI field. For example, when the BS truncates an N-bit DCI field into M bits (where N>M) and transmits it to the UE, the UE may add a zero padding bit of (N-M) bits to the truncated M-bit DCI field, and the UE may interpret the zero-padded N bits. For example, if the size of the DCI format (e.g., DCI format 3_X) for the sidelink transmission is greater than the size of the reference DCI format, truncation may be performed starting from a bit position corresponding to a most significant bit (MSB) of a resource assignment field. For example, if the DCI format size for the sidelink transmission is greater than the pre-configured DCI format size, the BS may truncate a part of DCI for the sidelink transmission. For example, if the DCI format size of the sidelink transmission is greater than the pre-configured DCI format size, the BS may truncate the resource assignment field of the DCI for the sidelink transmission, starting from a bit position corresponding to an MSB.

Option 2: For another example, the UE may be configured to transmit and/or detect the DCI format (e.g., DCI format 3_X) for the sidelink transmission in a UE-specific search space. Specifically, for example, according to a configuration of the BS in the UE-specific search space, the UE may attempt detection of: 1) DCI format 1_0/0_0; or 2) DCI format 1_1/0_1; or 3) DCI format 1_0/0_0 and DCI format (e.g., DCI format 3_X) for the sidelink transmission; or 4) DCI format 1_1/0_1 and DCI format (e.g., DCI format 3_X) for the sidelink transmission; or 5) DCI format (e.g., DCI format 3_X) for the sidelink transmission. That is, the BS be configured to additionally transmit DCI for the sidelink transmission in addition to a unicast scheduling DCI format for a Uu link or interface.

In this case, for example, the size of the DCI format (e.g., DCI format 3_X) for the sidelink transmission may be configured or determined through higher layer signaling (e.g., RRC signaling). In this case, it is assumed that the BS properly configures the size of the DCI format for the sidelink transmission to satisfy/achieve a DCI format size budget.

Alternatively, for example, a size of the DCI format (e.g., DCI format 3_X) for the sidelink transmission may be configured or determined to be equal to a size of the DCI format 1_0/0_0 transmitted in a common search space. For example, the size of the DCI format (e.g., DCI format 3_X) for the sidelink transmission may be configured or determined to be equal to the size of the DCI format 1_0/0_0 transmitted in the common search space configured or determined based on a size of CORESET 0 or a size of an initial DL BWP.

Alternatively, for example, a size of a specific DCI format transmitted in a search space corresponding to the DCI format (e.g., DCI format 3_X) for the sidelink transmission may be configured or determined to be equal to the size of the DCI format for the sidelink transmission. For example, when the DCI format 1_0/0_0 is transmitted in the search space corresponding to the DCI format (e.g., DCI format 3_X) for the sidelink transmission, the size of the DCI format for the sidelink transmission may be configured or determined to be equal to the size of the DCI format 1_0/0_0. For another example, when the DCI format 1_1/0_1 is transmitted in the search space corresponding to the DCI format (e.g., DCI format 3_X) for the sidelink transmission, the size of the DCI format for the sidelink transmission may be configured or determined to be equal to the size of the DCI format 1_0 or the DCI format 0_1. More specifically, for example, the size of the DCI format for the sidelink transmission may be configured or determined to be equal to a smaller one between the DCI format 1_1 and the DCI format 0_1. For example, the size of the DCI format for the sidelink transmission may be configured or determined to be equal to a greater one between the DCI format 1_1 and the DCI format 0_1.

For example, in order to match the size of the DCI format to a size of a reference DCI format, if the size of the DCI format (e.g., DCI format 3_X) for the sidelink transmission is less than the size of the reference DCI format, the BS may add a padding bit. For example, the padding bit may be added in the form of zero padding. For example, when the DCI format size for the sidelink transmission is less than a pre-configured DCI format size, the BS may add the padding bit to DCI for the sidelink transmission.

Otherwise, in order to match the size of the DCI format to the size of the reference DCI format, if the size of the DCI format (e.g., DCI format 3_X) for the sidelink transmission is greater than the size of the reference DCI format, the BS may truncate a part of a DCI field. The UE may perform zero padding on the truncated DCI field before interpreting the truncated DCI field. For example, when the BS truncates an N-bit DCI field into M bits (where N>M) and transmits it to the UE, the UE may add a zero padding bit of (N-M) bits to the truncated M-bit DCI field, and the UE may interpret the zero-padded N bits. For example, if the size of the DCI format (e.g., DCI format 3_X) for the sidelink transmission is greater than the size of the reference DCI format, truncation may be performed starting from a bit position corresponding to a most significant bit (MSB) of a resource assignment field. For example, if the DCI format size for the sidelink transmission is greater than the pre-configured DCI format size, the BS may truncate a part of DCI for the sidelink transmission. For example, if the DCI format size of the sidelink transmission is greater than the pre-configured DCI format size, the BS may truncate the resource assignment field of the DCI for the sidelink transmission, starting from a bit position corresponding to an MSB.

According to another embodiment of the present disclosure, a DCI format (e.g., DCI format 3_X) for the sidelink transmission may be transmitted in a CORESET and/or search space pre-configured for another usage with respect to the UE. For example, the DCI format (e.g., DCI format 3_X) for the sidelink transmission may be transmitted in the CORESET and/or search space pre-configured for another usage with respect to the UE. That is, for example, the UE may attempt detection of the DCI format (e.g., DCI format 3_X) for the sidelink transmission in the pre-configured CORESET and/or search space.

According to the limitation of the maximum number of attempts for blind decoding and/or the number of CCEs for channel estimation, some search spaces having a highest search space ID among configured search spaces may be disabled. That is, for example, the UE may not monitor a PDCCH candidate in the disabled some search spaces. For example, assuming that the BS implicitly configures a CORESET and/or search space for transmitting the DCI format (e.g., DCI format 3_X) for the sidelink transmission, if a search space having a highest search space ID is configured, the UE may have no opportunity for receiving the DCI format for the sidelink transmission due to the limitation of the maximum number of attempts for blind decoding and/or the number of CCEs for channel estimation. Alternatively, for example, when the UE implicitly configures a CORESET and/or search space for detecting the DCI format (e.g., DCI format 3_X) for the sidelink transmission, if a search space having a highest search space ID is configured, the UE may have no opportunity for receiving the DCI format for the sidelink transmission due to the limitation of the maximum number of attempts for blind decoding and/or the number of CCEs for channel estimation. Therefore, it may be useful to perform sidelink transmission if the DCI format for the sidelink transmission is configured in a search space in which the UE attempts detection by considering the limitation of the maximum number of attempts for blind decoding and/or the number of CCEs for channel estimation.

Option 1: The UE may attempt detection of a DCI format (e.g., a DCI format 3_X) for the sidelink transmission in a common search space configured in an active DL BWP.

For example, when it is configured that a DCI format 1_0/0_0 is detected by the UE in the common search space, a size of a DCI format (e.g., DCI format 3_X) for sidelink transmission may be set to be equal to a size of the DCI format 1_0/0_0.

Meanwhile, for example, when the DCI format 1_0/0_0 is not detected by the UE in the common search space, the size of the DCI format (e.g., DCI format 3_X) for sidelink transmission may be set to be equal to a size of a specific DCI format configured in the common search space. For example, the size of the DCI format (e.g., DCI format 3_X) for the sidelink transmission may be set to be equal to a smallest DCI format size among DCI formats configured in the common search space. For example, the size of the DCI format (e.g., DCI format 3_X) for the sidelink transmission may be set to be equal to the smallest DCI format size among DCI formats greater than or equal to a size required for the DCI format (e.g., DCI format 3_X) for the sidelink transmission.

Option 2: The UE may attempt detection of a DCI format (e.g., DCI format 3_X) for the sidelink transmission in a search space having a lowest search space ID among UE-specific search spaces configured in an active DL BWP. For example, in case of being transmitted in the search space having the lowest search space ID, in one aspect, there may be less opportunity of PDCCH transmission for sidelink in practice due to a PDCCH for a Uu link or interface. In another aspect, it may affect PDCCH transmission for the Uu link or interface or scheduling flexibility.

For example, a size of the DCI format (e.g., DCI format 3_X) for the sidelink transmission may be configured or determined to be equal to a size of the DCI format 1_0/0_0 transmitted in a common search space. For example, the size of the DCI format (e.g., DCI format 3_X) for the sidelink transmission may be configured or determined to be equal to the size of the DCI format 1_0/0_0 transmitted in the common search space configured or determined based on a size of CORESET 0 or a size of an initial DL BWP.

For example, a size of a specific DCI format transmitted in a search space corresponding to the DCI format (e.g., DCI format 3_X) for the sidelink transmission may be configured or determined to be equal to the size of the DCI format for the sidelink transmission. For example, when the DCI format 1_0/0_0 is transmitted in the search space corresponding to the DCI format (e.g., DCI format 3_X) for the sidelink transmission, the size of the DCI format for the sidelink transmission may be configured or determined to be equal to the size of the DCI format 1_0/0_0. For another example, when the DCI format 1_1/0_1 is transmitted in the search space corresponding to the DCI format (e.g., DCI format 3_X) for the sidelink transmission, the size of the DCI format for the sidelink transmission may be configured or determined to be equal to the size of the DCI format 1_0 or the DCI format 0_1. More specifically, for example, the size of the DCI format (e.g., DCI format 3_X) for the sidelink transmission may be configured or determined to be equal to a smaller one between the DCI format 1_1 and the DCI format 0_1. For example, the size of the DCI format (e.g., DCI format 3_X) for the sidelink transmission may be configured or determined to be equal to a greater one between the DCI format 1_1 and the DCI format 0_1.

Option 3. The UE may attempt detection of a DCI format (e.g., DCI format 3_X) for the sidelink transmission in a UE-specific space having a greatest search space among UE-specific search spaces not excluded by the limitation of the maximum number of attempts for blind decoding and/or the number of CCEs for channel estimation, among UE-specific search spaces configured in an active DL BWP.

For example, a size of the DCI format (e.g., DCI format 3_X) for the sidelink transmission may be configured or determined to be equal to a size of the DCI format 1_0/0_0 transmitted in a common search space. For example, the size of the DCI format (e.g., DCI format 3_X) for the sidelink transmission may be configured or determined to be equal to the size of the DCI format 1_0/0_0 transmitted in the common search space configured or determined based on a size of CORESET 0 or a size of an initial DL BWP.

For example, a size of a specific DCI format transmitted in a search space corresponding to the DCI format (e.g., DCI format 3_X) for the sidelink transmission may be configured or determined to be equal to the size of the DCI format for the sidelink transmission. For example, when the DCI format 1_0/0_0 is transmitted in the search space corresponding to the DCI format (e.g., DCI format 3_X) for the sidelink transmission, the size of the DCI format for the sidelink transmission may be configured or determined to be equal to the size of the DCI format 1_0/0_0. For another example, when the DCI format 1_1/0_1 is transmitted in the search space corresponding to the DCI format (e.g., DCI format 3_X) for the sidelink transmission, the size of the DCI format for the sidelink transmission may be configured or determined to be equal to the size of the DCI format 1_0 or the DCI format 0_1. More specifically, for example, the size of the DCI format (e.g., DCI format 3_X) for the sidelink transmission may be configured or determined to be equal to a smaller one between the DCI format 1_1 and the DCI format 0_1. For example, the size of the DCI format (e.g., DCI format 3_X) for the sidelink transmission may be configured or determined to be equal to a greater one between the DCI format 1_1 and the DCI format 0_1.

According to an embodiment of the present disclosure, in order to avoid an increase in at least any one of a blind decoding (e.g., blind decoding for a DCI format) budget, the maximum number of not overlapping CCEs for channel estimation, the maximum number of search spaces, and/or the maximum number of CORESETs, a payload size of a DCI format (e.g., DCI format 3_X) for sidelink transmission and a payload size of an NR Uu DCI format (e.g., DCI format_REF) may be configured to be matched to each other. For example, in a mode 1, the payload size of the DCI format (e.g., DCI format 3_X) for sidelink transmission and the payload size of the NR Uu DCI format (e.g., DCI format_REF) may be configured to be matched to each other. For example, when the BS directly schedules a transmission resource used in sidelink communication to the UE, the payload size of the DCI format (e.g., DCI format 3_X) for sidelink transmission and the payload size of the NR Uu DCI format (e.g., DCI format_REF) may be configured to be matched to each other. For example, when the BS directly schedules the transmission resource used in sidelink communication to the UE through a mode-1 DCI, the payload size of the DCI format for sidelink transmission and the payload size of the NR Uu DCI format may be configured to be matched to each other. For example, an NR Uu DCI format may be a DCI format configured/defined in the existing NR Uu. For example, the NR Uu DCI format matched to the payload size of the DCI format (e.g., DCI format 3_X) for sidelink transmission may be pre-configured/signaled. For example, the BS may configure or determine the payload size of the DCI format (e.g., DCI format 3_X) for sidelink transmission and the payload size of the NR Uu DCI format (e.g., DCI format_REF) to be matched to each other.

In the present disclosure, a case where the size of the DCI format 3_X is greater than the size of the DCI format_REF may include a case where the size of the DCI format 3_X is greater than the size of all of the existing DCI formats_REF. For example, when the size of the DCI format 3_X is greater than the size of the DCI format_REF, the BS may perform zero padding on the pre-configured/signal NR Uu DCI format to match the size of the NR Uu DCI format to the size of the DCI format 3_X.

Additionally/alternatively, for example, when the size of the DCI format 3_X is greater than the size of the DCI format_REF, the BS may perform zero padding on the DCI format_REF having a smallest difference with respect to the size of the DCI format 3_X to match the size of the DCI format_REF to the size of the DCI format 3_X. For example, the BS may select or determine the DCI format_REF having the smallest difference with respect to the size of the DCI format 3_X, without distinction of a search space type and/or an NR Uu DCI format. For example, the BS may select or determine the DCI format_REF having the smallest difference with respect to the size of the DCI format 3_X, without distinction of an associated search space type and/or NR Nu DCI format.

Additionally/alternatively, for example, when the size of the DCI format 3_X is greater than the size of the DCI format_REF, the BS may perform zero padding on a fallback DCI format_REF on a UE-specific search space (USS) to match the size of the fallback DCI format_REF to the size of the DCI format 3_X. For example, when the size of the DCI format 3_X is greater than the size of the DCI format_REF, the BS may perform zero padding preferentially on a pre-configured/signaled fallback DCI format_REF on the USS to match the size of the fallback DCI format_REF to the size of the DCI format 3_X. For example, when the size of the DCI format 3_X is greater than the size of the DCI format_REF, the BS may perform zero padding on the fallback DCI format_REF on the USS in preference to the DCI format_REF on a common search space (CSS) to match the size of the fallback DCI format_REF to the size of the DCI format 3_X. For example, the fallback DCI format_REF may include the pre-configured/signaled fallback DCI_REF.

Additionally/alternatively, for example, when the size of the DCI format 3_X is greater than the size of the DCI format_REF, the BS may perform zero padding on a non-fallback DCI format_REF on the USS to match the size of the non-fallback DCI format_REF to the size of the DCI format 3_X. For example, when the size of the DCI format 3_X is greater than the size of the DCI format_REF, the BS may perform zero padding preferentially on a pre-configured/signaled non-fallback DCI format_REF on the USS to match the size of the non-fallback DCI format_REF to the size of the DCI format 3_X. For example, when the size of the DCI format 3_X is greater than the size of the DCI format_REF, the BS may perform zero padding on the non-fallback DCI format_REF on the USS in preference to the DCI format_REF on the CSS to match the size of the non-fallback DCI format_REF to the size of the DCI format 3_X. For example, the non-fallback DCI format_REF may include the pre-configured/signaled non-fallback DCI_REF.

Additionally/alternatively, for example, when the size of the DCI format 3_X is greater than the size of the DCI format_REF, the BS may perform zero padding on a fallback DCI format_REF having a smallest difference with respect to the size of the DCI format 3_X among fallback DCI formats_REF on the USS to match the size of the fallback DCI format_REF to the size of the DCI format 3_X. For example, when the size of the DCI format 3_X is greater than the size of the DCI format_REF, the BS may perform zero padding preferentially on a fallback DCI format_REF having a smallest difference with respect to the size of the DCI format 3_X among fallback DCI formats_REF on the USS.

Additionally/alternatively, for example, when the size of the DCI format 3_X is greater than the size of the DCI format_REF, the BS may perform zero padding on a non-fallback DCI format_REF having a smallest difference with respect to the size of the DCI format 3_X among non-fallback DCI formats_REF on the USS to match the size of the non-fallback DCI format_REF to the size of the DCI format 3_X. For example, when the size of the DCI format 3_X is greater than the size of the DCI format_REF, the BS may perform zero padding preferentially on a non-fallback DCI format_REF having a smallest difference with respect to the size of the DCI format 3_X among non-fallback DCI formats_REF on the USS.

Additionally/alternatively, for example, when the size of the DCI format 3_X is greater than the size of the DCI format_REF, the BS may perform zero padding on a fallback DCI format_REF having a smallest difference with respect to the size of the DCI format 3_X among fallback DCI formats_REF on the CSS to match the size of the fallback DCI format_REF to the size of the DCI format 3_X. For example, when the size of the DCI format 3_X is greater than the size of the DCI format_REF, the BS may perform zero padding preferentially on a fallback DCI format_REF having a smallest difference with respect to the size of the DCI format 3_X among fallback DCI formats_REF on the CSS to match the size of the fallback DCI format_REF to the size of the DCI format 3_X.

Additionally/alternatively, for example, when the size of the DCI format 3_X is greater than the size of the DCI format_REF, the BS may perform zero padding on a non-fallback DCI format_REF having a smallest difference with respect to the size of the DCI format 3_X among non-fallback DCI formats_REF on the CSS to match the size of the non-fallback DCI format_REF to the size of the DCI format 3_X. For example, when the size of the DCI format 3_X is greater than the size of the DCI format_REF, the BS may perform zero padding preferentially on a non-fallback DCI format_REF having a smallest difference with respect to the size of the DCI format 3_X among non-fallback DCI formats_REF on the CSS to match the size of the non-fallback DCI format_REF to the size of the DCI format 3_X.

Additionally/alternatively, for example, when the size of the DCI format 3_X is greater than the size of the DCI format_REF, the BS may perform zero padding on a DCI format_REF detected/decoded based on a pre-configured RNTI type (e.g., C-RNTI) to match the size of the DCI format_REF to the size of the DCI format 3_X. For example, when the size of the DCI format 3_X is greater than the size of the DCI format_REF, the BS may perform zero padding preferentially on a DCI format_REF detected/decoded based on a pre-configured RNTI type (e.g., C-RNTI) to match the size of the DCI format_REF to the size of the DCI format 3_X. Additionally/alternatively, for example, when the size of the DCI format 3_X is greater than the size of the DCI format_REF, the BS may perform zero padding on a DCI format_REF having a smallest difference with respect to the size of the DCI format 3_X among DCI formats_REF detected/decoded based on a pre-configured RNTI type (e.g., C-RNTI) to match the size of the DCI format_REF to the size of the DCI format 3_X. For example, when the size of the DCI format 3_X is greater than the size of the DCI format_REF, the BS may perform zero padding preferentially on a DCI format_REF having a smallest difference with respect to the size of the DCI format 3_X among DCI formats_REF detected/decoded based on a pre-configured RNTI type (e.g., C-RNTI) to match the size of the DCI format_REF to the size of the DCI format 3_X. In this case, for example, an RNTI related to an NR Uu DCI format in which a specific UE attempts decoding may be preferential over an RNTI related to an NR Uu DCI format in which a plurality of UEs commonly attempt decoding. For example, in comparison with the DCI format_REF detected/decoded based on the RNTI related to the NR Uu DCI format in which the plurality of UEs commonly attempt decoding, the BS may perform zero padding on the DCI format_REF detected/decoded based on the RNTI related to the NR Uu DCI format in which the specific UE attempts decoding. For example, in comparison with the DCI format_REF detected/decoded based on the RNTI related to the NR Uu DCI format in which the plurality of UEs commonly attempt decoding, the BS may perform zero padding preferentially on the DCI format_REF detected/decoded based on the RNTI related to the NR Uu DCI format in which the specific UE attempts decoding.

As described above, the BS may perform zero padding on a specific DCI format_REF to match a size of the specific DCI format_REF to a size of the DCI format 3_X. In addition, for example, the BS may transmit the zero-padded specific DCI format_REF and/or the DCI format 3_X to the UE. In addition, for example, the UE may determine or assume that the size of the specific DCI format_REF is equal to the size of the DCI format 3_X, and the UE may receive/decode the specific DCI format_REF and/or DCI format 3_X.

In the present disclosure, a case where the size of the DCI format 3_X is less than the size of the DCI format_REF may include a case where the size of the DCI format 3_X is less than the size of all of the existing DCI formats_REF. For example, when the size of the DCI format 3_X is less than the size of the DCI format_REF, the BS may configure/transmit/signal in advance to the UE the information on the NR Uu DCI format in use to match the size of the DCI format 3_X. For example, the BS may perform zero padding on the DCI format 3_X to match the size of the DCI format 3_X to a pre-configured size of the NR Uu DCI format.

Additionally/alternatively, for example, when the size of the DCI format 3_X is less than the size of the DCI format_REF, the BS may perform zero padding on the DCI format 3_X according to a DCI format_REF having a smallest difference with respect to the size of the DCI format 3_X to match the size of the DCI format 3_X to the size of the DCI format_REF. For example, the BS may select or determine the DCI format_REF having the smallest difference with respect to the size of the DCI format 3_X, without distinction of a search space type and/or an NR Uu DCI format. For example, the BS may select or determine the DCI format_REF having the smallest difference with respect to the size of the DCI format 3_X, without distinction of an associated search space type and/or NR Nu DCI format.

Additionally/alternatively, for example, when the size of the DCI format 3_X is less than the size of the DCI format_REF, the BS may perform zero padding on the DCI format 3_X according to a fallback DCI format_REF on the USS to match the size of the DCI format 3_X to the size of the fallback DCI format_REF. For example, when the size of the DCI format 3_X is less than the size of the DCI format_REF, the BS may perform zero padding preferentially on the DCI format 3_X according to a pre-configured/signaled fallback DCI format_REF on the USS to match the size of the DCI format 3_X to the size of the fallback DCI format_REF. For example, when the size of the DCI format 3_X is less than the size of the DCI format_REF, the BS may perform zero padding on the DCI format 3_X according to the fallback DCI format_REF on the USS in preference to the DCI format_REF on the CSS to match the size of the DCI format 3_X to the size of the fallback DCI format_REF. For example, when the size of the DCI format 3_X is less than the size of the DCI format_REF, the BS may perform zero padding on the DCI format 3_X according to the pre-configured/signaled fallback DCI format_REF on the USS in preference to the DCI format_REF on the CSS to match the size of the DCI format 3_X to the size of the fallback DCI format_REF.

Additionally/alternatively, for example, when the size of the DCI format 3_X is less than the size of the DCI format_REF, the BS may perform zero padding on the DCI format 3_X according to a non-fallback DCI format_REF on the USS to match the size of the DCI format 3_X to the size of the non-fallback DCI format_REF. For example, when the size of the DCI format 3_X is less than the size of the DCI format_REF, the BS may perform zero padding preferentially on the DCI format 3_X according to a pre-configured/signaled non-fallback DCI format_REF on the USS to match the size of the DCI format 3_X to the size of the non-fallback DCI format_REF. For example, when the size of the DCI format 3_X is less than the size of the DCI format_REF, the BS may perform zero padding on the DCI format 3_X according to the non-fallback DCI format_REF on the USS in preference to the DCI format_REF on the CSS to match the size of the DCI format 3_X to the size of the non-fallback DCI format_REF. For example, when the size of the DCI format 3_X is less than the size of the DCI format_REF, the BS may perform zero padding on the DCI format 3_X according to the pre-configured/signaled non-fallback DCI format_REF on the USS in preference to the DCI format_REF on the CSS to match the size of the DCI format 3_X to the size of the non-fallback DCI format_REF.

Additionally/alternatively, for example, when the size of the DCI format 3_X is less than the size of the DCI format_REF, the BS may perform zero padding on the DCI format 3_X according to a fallback DCI format_REF having a smallest difference with respect to the size of the DCI format 3_X among fallback DCI formats_REF on the USS to match the size of the DCI format 3_X to the size of the fallback DCI format_REF. For example, when the size of the DCI format 3_X is less than the size of the DCI format_REF, the BS may perform zero padding preferentially on the DCI format 3_X according to a fallback DCI format_REF having a smallest difference with respect to the size of the DCI format 3_X among fallback DCI formats_REF on the USS to match the size of the DCI format 3_X to the size of the fallback DCI format_REF.

Additionally/alternatively, for example, when the size of the DCI format 3_X is less than the size of the DCI format_REF, the BS may perform zero padding on the DCI format 3_X according to a non-fallback DCI format_REF having a smallest difference with respect to the size of the DCI format 3_X among non-fallback DCI formats_REF on the USS to match the size of the DCI format 3_X to the size of the non-fallback DCI format_REF. For example, when the size of the DCI format 3_X is less than the size of the DCI format_REF, the BS may perform zero padding preferentially on the DCI format 3_X according to a non-fallback DCI format_REF having a smallest difference with respect to the size of the DCI format 3_X among non-fallback DCI formats_REF on the USS to match the size of the DCI format 3_X to the size of the non-fallback DCI format_REF.

Additionally/alternatively, for example, when the size of the DCI format 3_X is less than the size of the DCI format_REF, the BS may perform zero padding on the DCI format 3_X according to a fallback DCI format_REF having a smallest difference with respect to the size of the DCI format 3_X among fallback DCI formats_REF on the CSS to match the size of the DCI format 3_X to the size of the fallback DCI format_REF. For example, when the size of the DCI format 3_X is less than the size of the DCI format_REF, the BS may perform zero padding preferentially on the DCI format 3_X according to a fallback DCI format_REF having a smallest difference with respect to the size of the DCI format 3_X among fallback DCI formats_REF on the CSS to match the size of the DCI format 3_X to the size of the fallback DCI format_REF.

Additionally/alternatively, for example, when the size of the DCI format 3_X is less than the size of the DCI format_REF, the BS may perform zero padding on the DCI format 3_X according to a non-fallback DCI format_REF having a smallest difference with respect to the size of the DCI format 3_X among non-fallback DCI formats_REF on the CSS to match the size of the DCI format 3_X to the size of the non-fallback DCI format_REF. For example, when the size of the DCI format 3_X is less than the size of the DCI format_REF, the BS may perform zero padding preferentially on the DCI format 3_X according to a non-fallback DCI format_REF having a smallest difference with respect to the size of the DCI format 3_X among non-fallback DCI formats_REF on the CSS to match the size of the DCI format 3_X to the size of the non-fallback DCI format_REF.

Additionally/alternatively, for example, when the size of the DCI format 3_X is less than the size of the DCI format_REF, the BS may perform zero padding on the DCI format 3_X according to a DCI format_REF detected/decoded based on a pre-configured RNTI type (e.g., C-RNTI) to match the size of the DCI format 3_X to the size of the DCI format_REF. For example, when the size of the DCI format 3_X is less than the size of the DCI format_REF, the BS may perform zero padding preferentially on the DCI format 3_X according to the DCI format_REF detected/decoded based on the pre-configured RNTI type (e.g., C-RNTI) to match the size of the DCI format 3_X to the size of the DCI format_REF. Additionally/alternatively, for example, when the size of the DCI format 3_X is less than the size of the DCI format_REF, the BS may perform zero padding on the DCI format 3_X according to the DCI format_REF having a smallest difference with respect to the size of the DCI format 3_X among DCI formats_REF detected/decoded based on a pre-configured RNTI type (e.g., C-RNTI) to match the size of the DCI format 3_X to the size of the DCI format_REF. For example, when the size of the DCI format 3_X is less than the size of the DCI format_REF, the BS may perform zero padding preferentially on the DCI format 3_X according to the DCI format_REF having a smallest difference with respect to the size of the DCI format 3_X among DCI formats_REF detected/decoded based on a pre-configured RNTI type (e.g., C-RNTI) to match the size of the DCI format 3_X to the size of the DCI format_REF. In this case, for example, an RNTI related to an NR Uu DCI format in which a specific UE attempts decoding may be preferential over an RNTI related to an NR Uu DCI format in which a plurality of UEs commonly attempt decoding. For example, in comparison with the DCI format_REF detected/decoded based on the RNTI related to the NR Uu DCI format in which the plurality of UEs commonly attempt decoding, the BS may perform zero padding on the DCI format 3_X according to the DCI format_REF detected/decoded based on the RNTI related to the NR Uu DCI format in which the specific UE attempts decoding.

As described above, the BS may perform zero padding on the DCI format 3_X according to a specific DCI format_REF to match a size of the DCI format 3_X to a size of the specific DCI format_REF. In addition, for example, the BS may transmit the specific DCI format_REF and/or the zero-padded DCI format 3_X to the UE. In addition, for example, the UE may determine or assume that the size of the specific DCI format_REF is equal to the size of the DCI format 3_X, and the UE may receive/decode the specific DCI format_REF and/or DCI format 3_X.

In addition, for example, when not performed, it may be limitedly applied only when exceeding a blind decoding (e.g., blind decoding for a DCI format) budget, the maximum number of not overlapping CCEs for channel estimation, the maximum number of search spaces, and/or the maximum number of CORESETs or when these numbers cannot be maintained.

For example, when the BS does not perform a size fitting operation between the aforementioned DCI format 3_X and DCI format_REF (or, for example, NR Uu DCI format), the BS may limitedly perform the size fitting operation only when at least any one of a blind decoding (e.g., blind decoding for a DCI format) budget, the maximum number of not overlapping CCEs for channel estimation, the maximum number of search spaces, and/or the maximum number of CORESETs exceeds a threshold or cannot be maintained.

According to various embodiments of the present disclosure, the UE may perform sidelink communication with another UE, based on Table 8 to Table 24 below.

TABLE 8

It was agreed that a confirmation for activation/deactivation of SL configured grant type-2 is needed. Different from the type-2 UL configured grant, the type-2 SL configured grant does not have PUSCH resources for this confirmation. Therefore, if a confirmation message is to be transmitted through a higher layer signaling (e.g. MAC CE), additional UL grants for PUSCH to send the confirmation message should be transmitted as well as the DCI for type-2 SL configured grant activation/release. This would increase the signaling overhead.
Confirmation through a higher layer signaling also increases the latency as the timing for gNB to send UL grants for PUSCH is not guaranteed, which is different from e.g. the PUCCH case. If a higher layer signaling is used for confirmation, a mechanism for UE to start sidelink transmission within a guaranteed time needs to be further studied.
For confirmation on DCI to activate/release type-2 SL configured grant, physical layer signaling (e.g. PUCCH) could be beneficial for UE to report to gNB in terms of short reporting latency and small signaling overhead.

Referring to Table 8 above, for example, regarding resource allocation, for confirmation on DCI to activate/release type-2 SL configured grant, physical layer signaling (e.g. PUCCH) may be beneficial for the UE to report to the BS in terms of short reporting latency and small signaling overhead.

TABLE 9

Unlike LTE Uu interface, slot format which includes downlink, uplink, and flexible symbols is newly defined in NR Uu interface. The configuration of slot format is provided by cell specific or UE dedicated higher layer signaling, or provided by DCI if the corresponding UE is configured to monitor PDCCH for DCI format 2-0. There was a discussion for sidelink resources on licensed carrier based on signaling mentioned above, and several options were listed. Considering the coexistence with NR Uu, the discussion based on signaling for determining resources to be used for NR sidelink in licensed carrier can be a starting point. Discussion on signaling, e.g., whether to adopt signaling for new part such as 'sidelink' in slot format indication, can be initiated afterwards.

TABLE 9-continued

Basically, sidelink needs to avoid downlink transmission in order to prevent performance loss
due to interference from it. Regarding the slot format, one possible approach is to use uplink
symbols which are determined by cell-specific semi-static D/U assignment. Then, there occurs an
issue whether flexible symbols which are determined by cell-specific semi-static D/U assignment and
can be configured as uplink symbols are used to sidelink or not. If sidelink uses the flexible symbols,
sidelink resources may need to be dynamically (re)configured because the configuration for the
flexible symbols can be dynamically provided by DCI. It would be rather challenging if dynamic
resource (re)configuration is adopted especially for out-of-coverage UEs. Furthermore, inter-cell
interference can be another issue due to the different configuration on flexible symbols in different
cells. Therefore, at least uplink symbols configured by cell specific higher layer signaling can be used
to NR sidelink and further study is needed to decide whether flexible symbols are used for NR
sidelink.
In shared licensed carrier, at least uplink symbols/slots configured by cell specific higher layer
signaling in NR Uu is used for NR SL transmission.

Referring to Table 9 above, for example, in a shared licensed carrier, at least uplink symbols/slots configured by cell specific higher layer signaling in NR Uu is used for NR SL transmission.

TABLE 10

If sidelink open-loop power control based on downlink pathloss is enabled, cell edge sidelink UE
would transmit with higher power which may cause high interference to sidelink transmissions from
cell center UEs. LTE D2D introduced the resource pool separation based on DL RSRP in mode 2
operation so that UEs having similar transmit power level are multiplexed in the same resource pool,
and a similar solution can be considered for NR sidelink.
TX resource pool separation based on DL RSRP is supported to handle different SL TX power
depending on UE position, when SL open-loop power control based on DL pathloss is enabled for in-
coverage UE in the licensed spectrum.

Referring to Table 10 above, for example, when SL open-loop power control based on DL pathloss is enabled for in-coverage UE in the licensed spectrum, different SL TX power may be handled depending on a UE position through TX resource pool separation based on DL RSRP.

TABLE 11

SL DCI indicates a timing offset from the reception of DCI to PSSCH resource for both NR TDD
and NR FDD operation. If the serving cell operates in TDD mode and the scheduled cell in dedicated
ITS carrier for example, without indicating an arbitrary timing offset over PSSCH, the usage of
dedicated ITS carrier is limited by the TDD slot configuration in the serving cell. With the timing
offset indication, any slot in the dedicated ITS carrier can be scheduled by the SL DCI.
Even when the FDD mode is used in licensed carrier, the same issue is relevant. It's because the
SL DCI search space may not be configured at every slot on serving carrier. Without the timing offset
indication by SL DCI, the resources on scheduled carrier may be limited by the SL DCI configuration
instants. This is solved if SL DCI on serving carrier indicates an arbitrary timing offset for the
scheduled resources.
Timing offset indication by SL DCI is supported for both NR TDD and FDD configuration.

Referring to Table 11 above, for example, timing offset indication by SL DCI may be supported for both NR TDD and FDD configuration.

TABLE 12

UE is not expected to use different numerology in the configured SL BWP and active UL BWP in
the same carrier at a given time. Following the agreement, if UL BWP switching happens and the
numerology of UL BWP changes, SL BWP is no longer valid and deactivated. If numerology doesn't
change due to UL BWP switching, SL configured grant type-1 or type-2 resources are considered as
valid after UL BWP switching. If DL BWP is switched from one to another, SL configured grant type-1
or type-2 resources are always considered as valid. As for the PUCCH resources for SL HARQ
feedback report from transmitter UE to gNB, if UL/DL BWP is switched to a new BWP, the PUCCH
resources are considered as invalid and released for other use.

Referring to Table 12 above, for example, the UE may not be expected to use different numerology in the configured SL BWP and active UL BWP in the same carrier.

TABLE 13

When the NR Uu beam failure occurs, if there is mode 1 grant to use, mode 1 UE should use mode 1 grant during the NR Uu Beam Recovery. Otherwise (i.e., if there isn't mode 1 grant to use), mode 1 UE should use exceptional pool.
When the NR Uu beam failure occurs, mode 2 UE should continue to use normal pool during the NR Uu Beam Recovery.
When the NR Uu beam failure occurs, although mode 1 scheduling is unavailable, if there is mode 1 grant (i.e., configured grant) to use, mixed mode UE should use the mode 1 grant (i.e., configured grant) during the NR Uu Beam Recovery.
When the NR Uu beam failure occurs, if there isn't mode 1 grant to use and if sensing results are valid for normal pool, mixed mode UE should use the normal pool instead of using the exceptional pool during the NR Uu Beam Recovery.
When the NR Uu beam failure occurs, if there isn't mode 1 grant to use and if sensing results is invalid for normal pool, mixed mode UE can use the exceptional pool during the NR Uu Beam Recovery.

Referring to Table 13 above, for example, when a beam failure occurs, the UE may use a mode-1 grant to use during the NR Uu beam recovery.

TABLE 14

If UL BWP is switched to another UL BWP with numerology different from that of configured SL BWP, SL TX/RX operation is deactivated.
If mode 1 UE has SL configured grant, it assumes that such grant is still valid even after UL/DL BWP switching.
Mode 1 UE assumes that PUCCH resource for SL HARQ feedback report is released if PUCCH UL BWP is switched to another UL BWP, or if DL BWP paired with PUCCH UL BWP is switched to another DL BWP.

Referring to Table 14 above, for example, when the UE is switched to another UL BWP with numerology different from that of configured SL BWP, an SL TX/RX operation may be deactivated.

TABLE 15

SL HARQ feedback report from transmitter UE to gNB is supported. For mode 1, in order for transmitter UE to report HARQ feedback from receiver UE, gNB schedules PUCCH resources for HARQ feedback report by the SL DCI that indicates PSCCH and PSSCH resources associated to the HARQ feedback.
SL DCI indicates PUCCH resources for TX UE to report SL HARQ feedback from RX UE.

Referring to Table 15 above, for example, SL DCI may indicate PUCCH resources for TX UE to report SL HARQ feedback from RX UE.

TABLE 16

In terms of scheduling flexibility, it would be beneficial to support dynamic scheduling of SL HARQ feedback report timing. It provided benefit of avoiding collision between SL HARQ feedback report timing and DL HARQ feedback timing, which enhances a PUCCH coverage. To achieve this benefit, DCI indicates a timing offset for the associated PUCCH transmission. The timing offset is defined as a gap in slot from a reference point. In NR Uu link, the reference point is the slot containing PDSCH. That is, the timing offset (K1) is the slot gap between two slots containing PDSCH and PUCCH. There are several options for a reference point for PUCCH to report SL HARQ feedback.
First, a slot containing PDCCH that schedules SL resources can be a reference point. In this case, K1 is defined as a gap from a slot containing PDCCH to a slot containing PUCCH. The K1 value needs to be large enough to accommodate all the processing times for PSCCH, PSSCH, and PSFCH transmission.

Referring to Table 16 above, for example, a reference point of PUCCH for reporting SL HARQ feedback may be configured or determined.

TABLE 17

Second, a slot containing PSCCH or PSSCH can be a reference point. In this case, K1 is defined
as gap from a slot containing PSCCH or PSSCH to a slot containing PUCCH. There is no
misunderstanding between UE and gNB on PSCCH and PSSCH timing. Since the PSCCH and PSSCH
slot position is behind that of PDCCH, the K1 value is smaller than that of the first case above. It's
necessary that the K1 value is determined to accommodate the processing time for PSSCH and/or
PSFCH transmissions.
Third, a slot containing PSFCH can be a reference point. In this case, K1 is defined as slot gap
from a slot containing PSFCH to a slot containing PUCCH. As the timing of PSFCH is derived from
that of PSCCH/PSSCH, UE and gNB have same understanding on the PSFCH timing. After receiving
PSFCH, TX UE can decide PUCCH timing for SL HARQ feedback report to gNB.

Referring to Table 17 above, for example, a reference point of PUCCH for reporting UL HARQ feedback may be configured or determined as any one of a slot containing PSCCH, a slot containing PSSCH, and a slot containing PSFCH.

TABLE 18

If simultaneous transmission of SL HARQ feedback report and DL HARQ feedback on the same
PUCCH needs to be supported, the concept of virtual DAI and PDSCH can be introduced. SL DCI
can indicate virtual DAI and PDSCH, and the virtual PDSCH can be a reference point. Using virtual
DAI and PDSCH enables to reuse existing DL HARQ feedback multiplexing scheme including SL
HARQ feedback report.
For indication of frequency or code domain resources, dynamic indication of PUCCH
resources enables efficient management of resources. It avoids potential collision of PUCCH
resources and reservation of unnecessary PUCCH resources.
For SL HARQ feedback report to gNB, DL HARQ feedback scheme in NR Uu is a starting point.
DCI indicates slot where the associated PUCCH is transmitted.
reference point of PUCCH Tx timing (e.g. a slot where the relevant PSFCH is
transmitted).
DCI indicates PUCCH resource to be used for SL HARQ feedback report.

Referring to Table 18 above, for example, when the UE reports SL HARQ feedback to the gNB, a DL HARQ feedback scheme in NR Uu may be a starting point. For example, DCI may indicate a slot in which associated PUCCH is transmitted.

TABLE 19

To reduce the codebook size of SL HARQ feedback report, UE expects to report the SL HAR
feedback on reception of a single PSSCH with a single codebook. In this case, HARQ codebook size
doesn't need to be extended to report feedback on a number of possible candidates given PUCCH
timing.
A single PUCCH resource only carries all the SL HARQ feedbacks transmitted on a single PSFCH slot.

Referring to Table 19 above, for example, a single PUCCH resource may transfer only all of sidelink HARQ feedbacks transmitted through a single PSFCH slot.

TABLE 20

A simple approach of multiplexing SL HARQ feedback report and DL HARQ feedback is to
guarantee time-multiplexed transmission between the two feedbacks. That is, it's not expected they
are transmitted on same PUCCH resources at given time. This approach has pros and cons: It does
not require any specification modification on DL HARQ feedback scheme. But it may require SL
HARQ feedback report can be postponed when conflicted with DL HARQ feedback timing, thus
increase the latency of the SL HARQ feedback report. In addition it may restrict flexibility in
scheduling feedback timing to some extent. If HARQ feedback on DL SPS or SL configured grant is
transmitted, it may cause dropping SL HARQ feedback report as the relevant HARQ feedback timing
and PUCCH resource allocation cannot be dynamically changed.

Referring to Table 20 above, in order to multiplex sidelink HARQ feedback report and downlink feedback, time-multiplexing transmission between the two feedbacks may be guaranteed.

TABLE 21

Another approach is to support simultaneous transmission of SL HARQ feedback report and
DL HARQ feedback in same slot. In this case, it is necessary to modify existing HARQ codebook
design, depending on the following cases:
1) Semi-static DL HARQ codebook with TB-based scheduling
2) Semi-static DL HARQ codebook with CBG-based scheduling
3) Dynamic DL HARQ codebook with TB-based scheduling
4) Dynamic DL HARQ codebook with CBG-based scheduling Referring to Table 21 above, for example, simultaneous transmission in the same slot may be supported to multiplex sidelink HARQ feedback report and downlink feedback.

TABLE 22

First of all, it can be considered to reuse existing DL HARQ feedback mechanism by
introducing the concept of virtual DAI and PDSCH allocation. For the semi-static codebook cases,
as the order of HARQ-ACK bits is determined based on SLIV of PDSCH, it is necessary to define
reference or virtual PDSCH for PDCCH scheduling NR SL resources. For the dynamic codebook
cases, as the order of HARQ-ACK bits is determined based DAI and K0 (slot offset between PDCCH
and PDSCH), it is necessary to define reference or virtual DAI together with virtual PDSCH for
PDCCH scheduling NR SL resources.
Alternatively, it can be considered to add the reserved bits to the current DL HARQ codebook
to accommodate SL HARQ feedback report. In this case, the number of reserved bits is
determined by the number of PSSCH slots associated with the same PSFCH slot. There are some
cases for consideration:

Referring to Table 22 above, for example, virtual downlink assignment index (DAI) and PDSCH allocation may be introduced to reuse the existing downlink HARQ feedback mechanism, or a reserved bit may be added to a current downlink HARQ codebook to accommodate sidelink HARQ feedback report.

TABLE 23

1) If the number of PSSCH slots associated with the same PSFCH slot is N, and if a TX UE
 transmits multiple PSSCHs across N slots to the N RX UEs, the TX UE will receive N PSFCHs
 from the N RX UEs. In this case, the number of reserved bits for SL HARQ feedback can be
 decided as N.
2) If a TX UE transmits multiple PSSCHs with N TBs across N slots to one RX UE, the TX UE
 will receive one PSFCH with N bits of SL HARQ feedbacks from the RX UE. In this case, the
 number of reserved bits for SL HARQ feed back can be decided as N.
3) If a TX UE transmits multiple PSSCHs with a TB across N slots to one RX UE, the TX UE
 will
 receive one bit of SL HARQ feedback from the RX UE. In this case, the TX UE extends the
 received one bit into N bits, and the number of reserved bits for SL HARQ feedback can
 be decided as N.

Referring to Table 23 above, for example, the number of reserved bits for sidelink HARQ feedback may be determined to N.

TABLE 24

The following options can be considered in terms of multiplexing between SL HARQ feedback and
DL HARQ feedback:
Option 1: TDMed transmission between SL HARQ feedback and DL HARQ feedback.
Option 2: Simultaneous transmission of SL HARQ feedback and DL HARQ feedback.
how to construct HARQ codebook by using both DL HARQ feedback and SL HARQ
feedback, (e.g. adding reserved bits next to the current DL HARQ codebook to
accommodate SL HARQ feedback)

Referring to Table 24 above, for example, time-division-multiplexed transmission and simultaneous transmission may be considered for multiplexing between sidelink HARQ feedback and downlink HARQ feedback.

Figure 13:
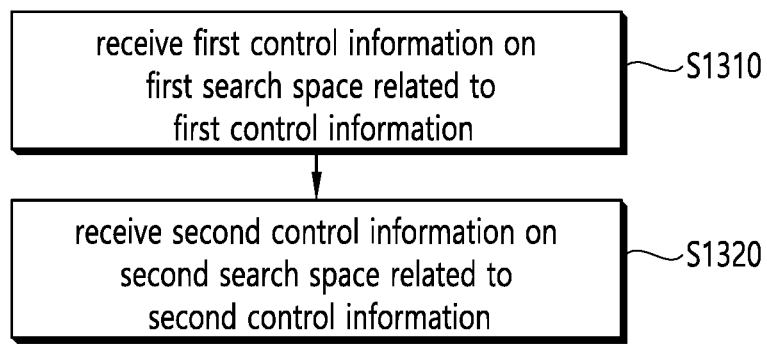
FIG. 13 shows a method of receiving control information by a first apparatus 100 from a BS according to an embodiment of the present disclosure.

FIG. 13 shows a method of receiving control information by a first apparatus 100 from a BS according to an embodiment of the present disclosure. The embodiment of FIG. 13 may be combined with various embodiments of the present disclosure.

Referring to FIG. 13, in step S1310, the first apparatus 100 may receive first control information on a first search space related to the first control information. In step S1320, the first apparatus 100 may receive second control information on a second search space related to the second control information.

For example, the first search space related to the first control information overlaps with the second search space related to the second control information, based on that a BS allocates a resource related to sidelink transmission to the first apparatus 100 in a carrier in which Uu communication is performed. For example, the first control information may include control information for scheduling a resource related to Uu communication. For example, the second control information may include control information for scheduling performed by BS for a resource related to sidelink transmission of the first apparatus. For example, the first apparatus 100 may match a size of the second control information to a size of pre-configured third control information. For example, the pre-configured third control information may be the same as the first control information. For example, the pre-configured third control information may be first information with which a search space is shared. For example, the pre-configured third control information may be pre-configured control information with which the search space is not shared and which is related to Uu communication.

Alternatively, in a carrier other than a carrier in which Uu communication is performed, the first search space related to the first control information may not overlap with the second search space related to the second control information, based on that a BS allocates a resource related to sidelink transmission to the first apparatus 100. For example, in a carrier other than a carrier in which Uu communication is performed, the first search space related to the first control information may overlap with the second search space related to the second control information due to a network implementation, based on that the BS allocates a resource related to sidelink transmission to the first apparatus 100.

For example, a padding bit may be added to the second control information, based on that the size of the second control information is less than the size of the pre-configured third control information. For example, a part of a pre-configured field of the second control information may be truncated based on that the size of the second control information is greater than the size of the pre-configured third control information. For example, the first apparatus 100 may receive the truncated second control information from the BS. For example, the first apparatus 100 may perform zero padding with a size of the pre-configured field before being truncated for a pre-configured field of the truncated second control information. For example, the first apparatus 100 may decode the pre-configured field of the second control information subjected to the zero padding. For example, the pre-configured field of the second control information may be truncated starting from a most significant bit (MSB) of a resource assignment field.

For example, the pre-configured third control information is a fallback downlink control information (DCI) related to Uu communication. For example, the fallback DCI related to the Uu communication may be any one of a DCI format 0_0 related to uplink and a DCI format 1_0 related to downlink. For example, the pre-configured third control information may be non-fallback DCI related to Uu communication. For example, the fallback DCI related to the Uu communication may be any one of a DCI format 0_1 related to uplink and a DCI format 1_1 related to downlink.

For example, the search space related to the second control information may be any one of a common search space and UE-specific search space configured in an active downlink bandwidth part (BWP). For example, a size of the second control information may be equal to a size of the first control information having a closest size among a plurality of pieces of first control information of which monitoring is configured in the common search space or the UE-specific search space.

The aforementioned embodiment may be applied to various devices described below. For example, a processor 102 of the first apparatus 100 may control a transceiver 106 to receive first control information on a first search space related to the first control information. In addition, the processor 102 of the first apparatus 100 may control the transceiver 106 to receive second control information on a second search space related to the second control information.

According to an embodiment of the present disclosure, there may be provided a first apparatus for performing wireless communication. For example, the first apparatus may include: one or more memories storing instructions; one or more transceivers; and one or more processors connected to the one or more memories and the one or more transceivers. For example, the one or more processors may execute the instructions to receive first control information on a first search space related to the first control information, and receive second control information on a second search space related to the second control information. For example, the first search space related to the first control information may overlap with the second search space related to the second control information, based on that a BS allocates a resource related to sidelink transmission to the first apparatus in a carrier in which Uu communication is performed. For example, the first control information may include control information for scheduling a resource related to Uu communication, and the second control information may include control information for scheduling performed by the BS for a resource related to sidelink transmission of the first apparatus.

According to an embodiment of the present disclosure, there may be provided an apparatus configured to control a first UE. For example, the apparatus may include: one or more processors; and one or more memories operably connectable to the one or more processors and storing instructions. For example, the one or more processors may execute the instructions to receive first control information on a first search space related to the first control information, and receive second control information on a second search space related to the second control information. For example, the first search space related to the first control information may overlap with the second search space related to the second control information, based on that a BS allocates a resource related to sidelink transmission to the first apparatus in a carrier in which Uu communication is performed. The first control information may include control information for scheduling a resource related to Uu communication, and the second control information may include control information for scheduling performed by the BS for a resource related to sidelink transmission of the first apparatus.

According to an embodiment of the present disclosure, there may be provided a non-transitory computer-readable medium having instructions recorded thereon. For example, the instructions, when enacted by one or more processors, may cause the one or more processors to receive, by a first apparatus, first control information on a first search space related to the first control information, and receive second control information on a second search space related to the second control information. For example, the first search space related to the first control information may overlap with the second search space related to the second control information, based on that a BS allocates a resource related to sidelink transmission to the first apparatus in a carrier in which Uu communication is performed. The first control information may include control information for scheduling a resource related to Uu communication, and the second control information may include control information for scheduling performed by the BS for a resource related to sidelink transmission of the first apparatus.

Figure 14:
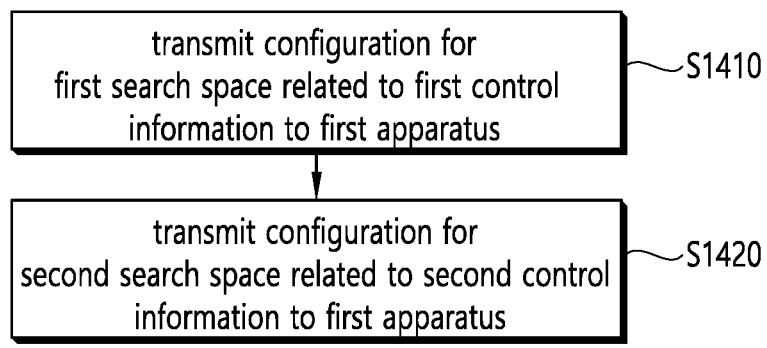
FIG. 14 shows a method of transmitting control information by a BS to a first apparatus 100 according to an embodiment of the present disclosure.

FIG. 14 shows a method of transmitting control information by a BS to a first apparatus 100 according to an embodiment of the present disclosure. The embodiment of FIG. 14 may be combined with various embodiments of the present disclosure.

Referring to FIG. 14, in step S1410, the BS may transmit a configuration for a first search space related to first control information to the first apparatus 100. In step S1420, the BS may transmit a configuration for a second search space related to the second control information to the first apparatus 100.

For example, the first search space related to the first control information may overlap with the second search space related to the second control information, based on that the BS allocates a resource related to sidelink transmission to the first apparatus 100 in a carrier in which Uu communication is performed. For example, the first control information may include control information for scheduling a resource related to Uu communication. For example, the second control information may include control information for scheduling performed by the BS for a resource related to sidelink transmission of the first apparatus. For example, the first apparatus 100 may match a size of the second control information to a size of pre-configured third control information. For example, the pre-configured third control information may be the same as the first control information. For example, the pre-configured third control information may be first information with which a search space is shared. For example, the pre-configured third control information may be pre-configured control information with which the search space is not shared and which is related to Uu communication.

Alternatively, in a carrier other than a carrier in which Uu communication is performed, the first search space related to the first control information may not overlap with the second search space related to the second control information, based on that a BS allocates a resource related to sidelink transmission to the first apparatus 100. For example, in a carrier other than a carrier in which Uu communication is performed, the first search space related to the first control information may overlap with the second search space related to the second control information due to a network implementation, based on that the BS allocates a resource related to sidelink transmission to the first apparatus 100.

For example, a padding bit may be added to the second control information, based on that the size of the second control information is less than the size of the pre-configured third control information. For example, a part of a pre-configured field of the second control information may be truncated based on that the size of the second control information is greater than the size of the pre-configured third control information. For example, the first apparatus 100 may receive the truncated second control information from the BS. For example, the first apparatus 100 may perform zero padding with a size of the pre-configured field before being truncated for a pre-configured field of the truncated second control information. For example, the first apparatus 100 may decode the pre-configured field of the second control information subjected to the zero padding. For example, the pre-configured field of the second control information may be truncated starting from a most significant bit (MSB) of a resource assignment field.

For example, the pre-configured third control information is a fallback downlink control information (DCI) related to Uu communication. For example, the fallback DCI related to the Uu communication may be any one of a DCI format 0_0 related to uplink and a DCI format 1_0 related to downlink. For example, the pre-configured third control information may be non-fallback DCI related to Uu communication. For example, the fallback DCI related to the Uu communication may be any one of a DCI format 0_1 related to uplink and a DCI format 1_1 related to downlink.

For example, the search space related to the second control information may be any one of a common search space and UE-specific search space configured in an active downlink bandwidth part (BWP). For example, a size of the second control information may be equal to a size of the first control information having a closest size among a plurality of pieces of first control information of which monitoring is configured in the common search space or the UE-specific search space.

According to an embodiment of the present disclosure, there may be provided a BS performing wireless communication. For example, the BS may transmit a configuration for a first search space related to first control information to the first apparatus, and may transmit a configuration for a second search space related to the second control information to the first apparatus. For example, the first search space related to the first control information may overlap with the second search space related to the second control information, based on that the BS allocates a resource related to sidelink transmission to the first apparatus in a carrier in which Uu communication is performed. For example, the first control information may include control information for scheduling a resource related to Uu communication, and the second control information may include control information for scheduling performed by the BS for a resource related to sidelink transmission of the first apparatus.

According to another embodiment of the present disclosure, a first apparatus may configure one or more BWPs related to communication with a BS. For example, the first apparatus may receive first control information on a first search space for the first control information on the one or more BWPs. For example, the first apparatus may receive second control information on a second search space for the second control information on the one or more BWPs. For example, the first search space may overlap with the second search space, based on that the BS allocates a resource related to sidelink transmission to the first apparatus in a carrier in which Uu communication is performed. For example, the first control information may include control information for scheduling a resource related to Uu communication. For example, the second control information may include control information for scheduling performed by the BS for a resource related to sidelink transmission of the first apparatus. For example, a size of the second control information and a size of pre-configured third control information may be matched by the first apparatus 100. For example, the pre-configured third control information may be the same as the first control information.

According to another embodiment of the present disclosure, there may be provided a first apparatus for performing wireless communication. For example, the first apparatus may include: one or more memories storing instructions; one or more transceivers; and one or more processors connected to the one or more memories and the one or more transceivers. For example, the one or more processors may execute the instructions to receive first control information on a first search space related to the first control information, and receive second control information on a second search space related to the second control information. For example, the first search space related to the first control information may overlap with the second search space related to the second control information, based on that a BS allocates a resource related to sidelink transmission to the first apparatus in a carrier in which Uu communication is performed. For example, the first control information may include control information for scheduling a resource related to Uu communication, and the second control information may include control information for scheduling performed by the BS for a resource related to sidelink transmission of the first apparatus.

Examples for the aforementioned proposed scheme can be included as one of implementation methods of the present disclosure, and thus can be apparently regarded as a sort of proposed methods. In addition, although the aforementioned proposed schemes can be independently implemented, it is also possible to be implemented by combining (or merging) some proposed schemes. A rule may be defined such that information on whether to apply the proposed methods (or information on rules of the proposed methods) is reported by a BS to a UE or by a TX UE to an RX UE through a pre-defined signal (e.g., a physical layer signal or a higher layer signal).

Various embodiments of the present disclosure may be applied not only in vehicle-to-vehicle communication but also in vehicle-to-pedestrian communication and vehicle-to-BS, or vehicle-to-fixed node communication. For example, it may be regarded that a receiver of the other party has a fixed position and speed in communication with the BS.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 15:
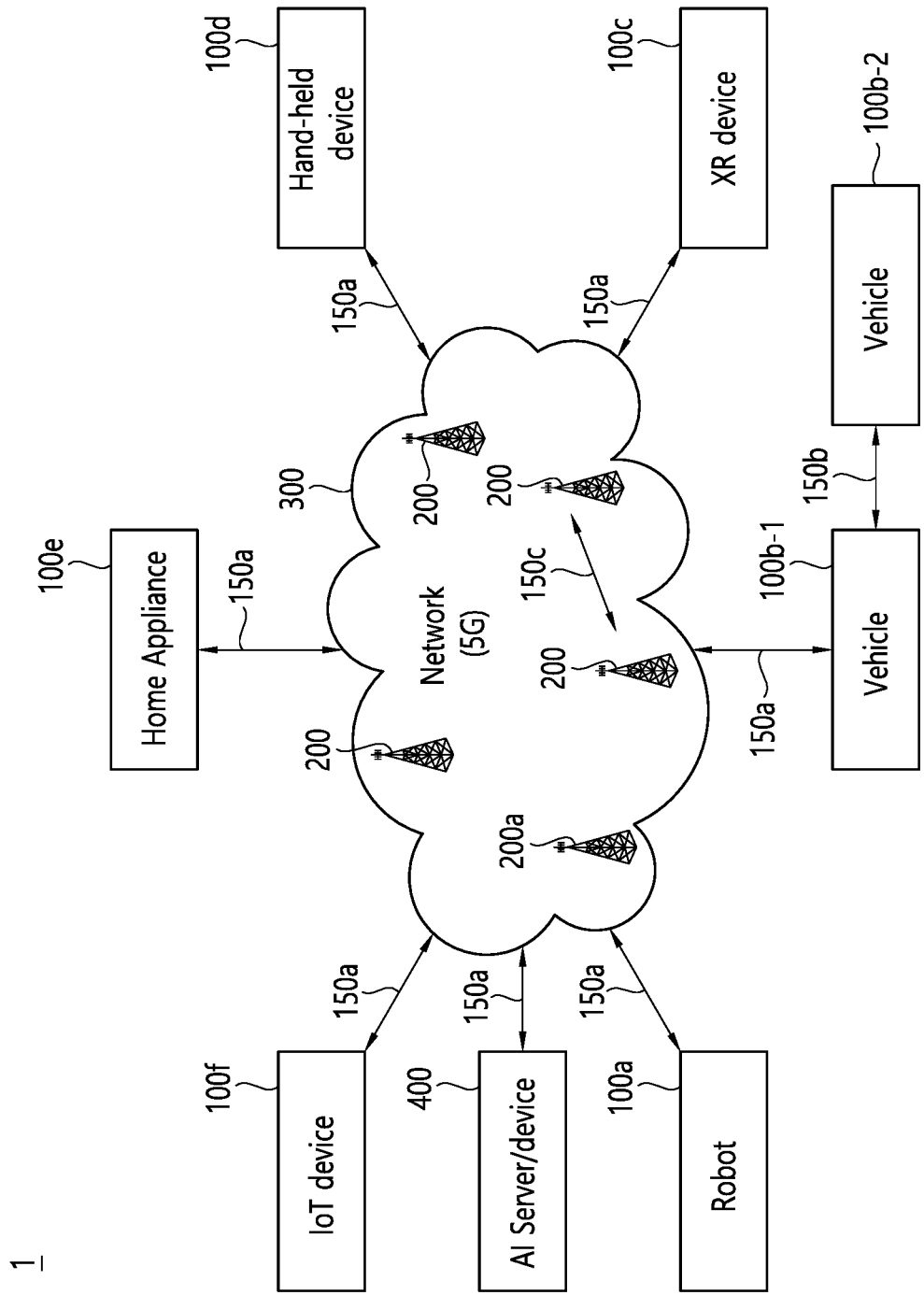
FIG. 15 shows a communication system 1, in accordance with an embodiment of the present disclosure.

FIG. 15 shows a communication system 1, in accordance with an embodiment of the present disclosure.

Referring to FIG. 15, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 16:
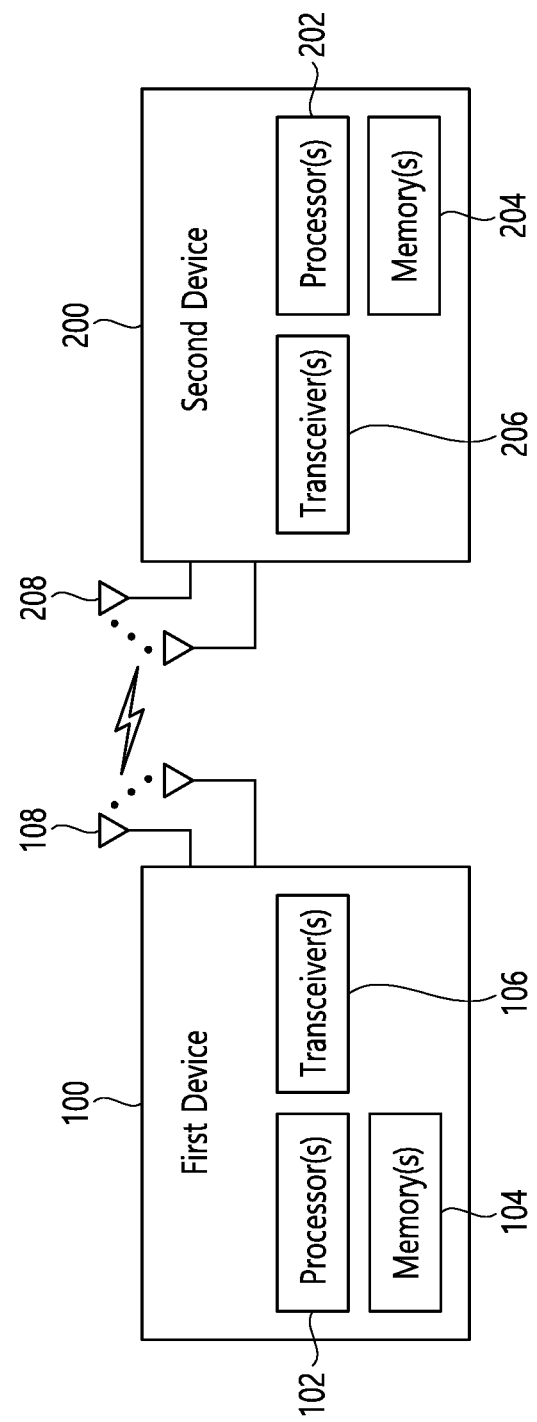
FIG. 16 shows wireless devices, in accordance with an embodiment of the present disclosure.

FIG. 16 shows wireless devices, in accordance with an embodiment of the present disclosure.

Referring to FIG. 16, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 15.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 17:
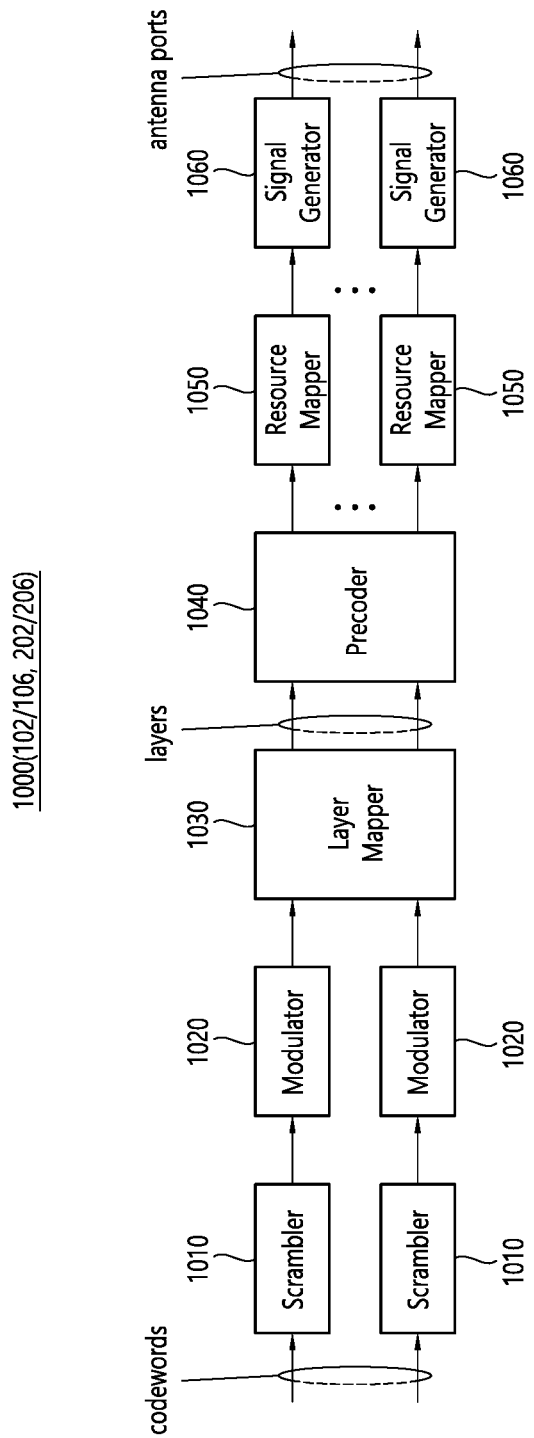
FIG. 17 shows a signal process circuit for a transmission signal, in accordance with an embodiment of the present disclosure.

FIG. 17 shows a signal process circuit for a transmission signal, in accordance with an embodiment of the present disclosure.

Referring to FIG. 17, a signal processing circuit 1000 may include scramblers 1010, modulators 1020, a layer mapper 1030, a precoder 1040, resource mappers 1050, and signal generators 1060. An operation/function of FIG. 17 may be performed, without being limited to, the processors 102 and 202 and/or the transceivers 106 and 206 of FIG. 16. Hardware elements of FIG. 17 may be implemented by the processors 102 and 202 and/or the transceivers 106 and 206 of FIG. 16. For example, blocks 1010 to 1060 may be implemented by the processors 102 and 202 of FIG. 16. Alternatively, the blocks 1010 to 1050 may be implemented by the processors 102 and 202 of FIG. 16 and the block 1060 may be implemented by the transceivers 106 and 206 of FIG. 16.

Codewords may be converted into radio signals via the signal processing circuit 1000 of FIG. 17. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 17. For example, the wireless devices (e.g., 100 and 200 of FIG. 16) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 18:
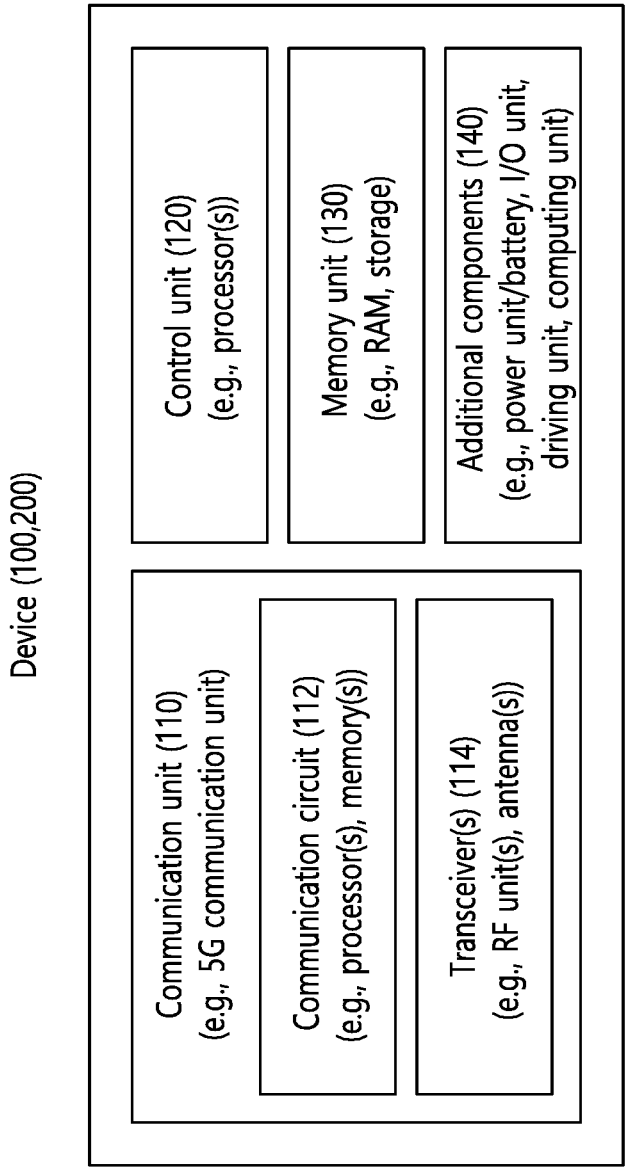
FIG. 18 shows a wireless device, in accordance with an embodiment of the present disclosure.

FIG. 18 shows another example of a wireless device, in accordance with an embodiment of the present disclosure. The wireless device may be implemented in various forms according to a use-case/service (refer to FIG. 15).

Referring to FIG. 18, wireless devices 100 and 200 may correspond to the wireless devices 100 and 200 of FIG. 16 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 16. For example, the transceiver(s) 114 may include the one or more transceivers 106 and 206 and/or the one or more antennas 108 and 208 of FIG. 16. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 15), the vehicles (100b-1 and 100b-2 of FIG. 15), the XR device (100c of FIG. 15), the hand-held device (100d of FIG. 15), the home appliance (100e of FIG. 15), the IoT device (100f of FIG. 15), a digital broadcast terminal, a hologram device, a public safety device, an MTC device, a medicine device, a fintech device (or a finance device), a security device, a climate/environment device, the AI server/device (400 of FIG. 15), the BSs (200 of FIG. 15), a network node, etc. The wireless device may be used in a mobile or fixed place according to a use-example/service.

In FIG. 18, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 18 will be described in detail with reference to the drawings.

Figure 19:
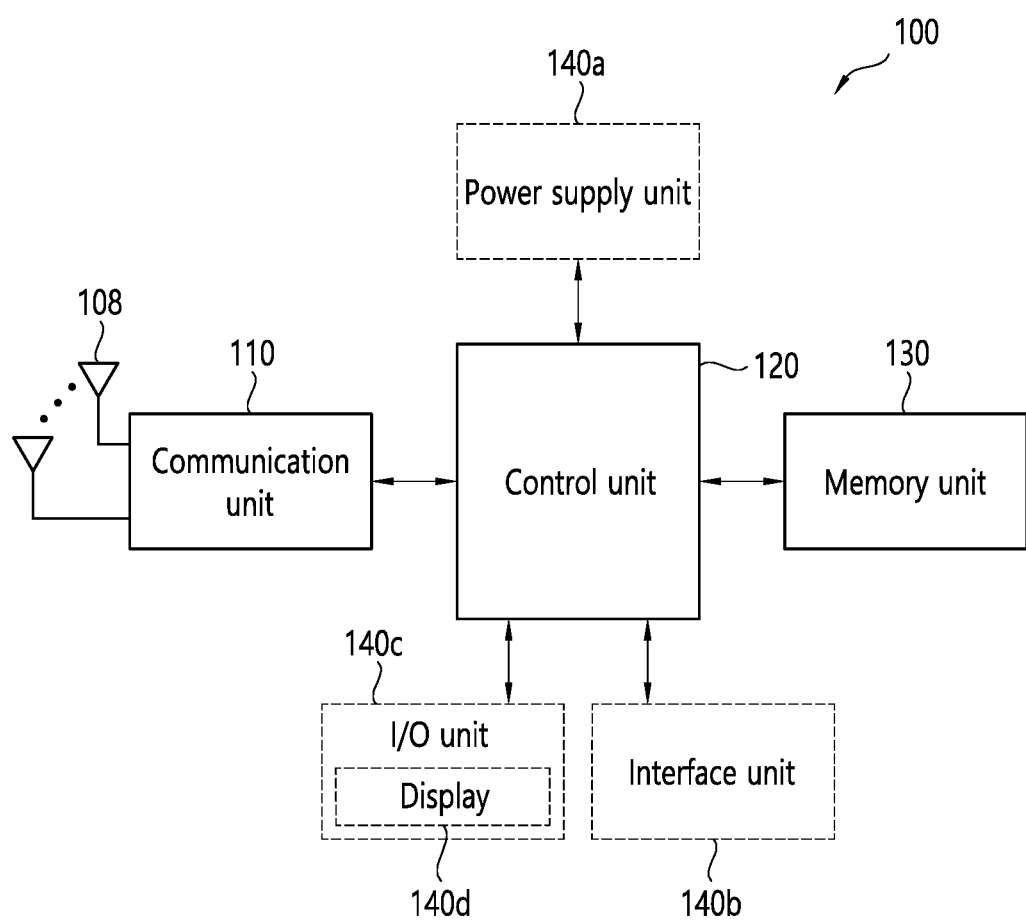
FIG. 19 shows a hand-held device, in accordance with an embodiment of the present disclosure.

FIG. 19 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 19, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 18, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 20:
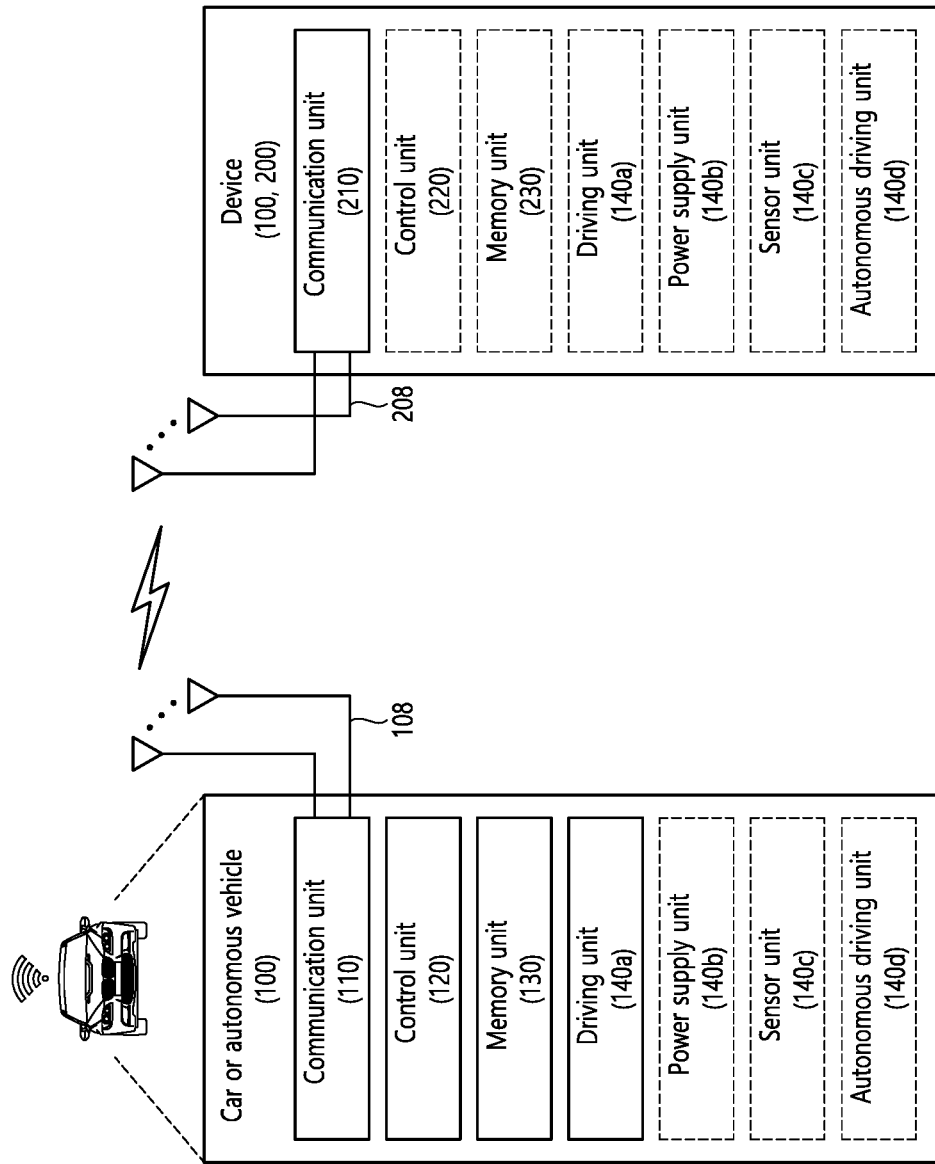
FIG. 20 shows a car or an autonomous vehicle, in accordance with an embodiment of the present disclosure.

FIG. 20 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 20, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 18, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140a may cause the vehicle or the autonomous vehicle 100 to drive on a road. The driving unit 140a may include an engine, a motor, a powertrain, a wheel, a brake, a steering device, etc. The power supply unit 140b may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first apparatus, the method comprising:
   monitoring first control information on a first user equipment (UE)-specific search space configured in an active downlink bandwidth part (BWP) related to the first control information; and
   monitoring second control information on a second UE-specific search space configured in the active downlink BWP related to the second control information,
   wherein the first control information comprises control information for scheduling a resource related to Uu communication,
   wherein the second control information comprises control information for scheduling performed by the base station for a resource related to sidelink transmission of the first apparatus,
   wherein, based on that a total number of sizes related to the first control information and second control information before zero padding is greater than 4, the second control information includes zero padding,
   wherein a size of the second control information including zero padding is equal to a smallest size among sizes related to the first control information that are larger than the second control information before zero padding, and
   wherein the size of the second control information before zero padding is not larger than all sizes related to the first control information.

2. The method of claim 1, wherein the size of the second control information is matched to a size of pre-configured third control information, and
   wherein the first UE-specific search space related to the first control information overlaps with the second UE-specific search space related to the second control information.

3. The method of claim 2, wherein the pre-configured third control information is the same as the first control information.

4. The method of claim 2, wherein a padding bit is added to the second control information, based on that the size of the second control information is less than the size of the pre-configured third control information.

5. The method of claim 2, wherein a part of a pre-configured field of the second control information is truncated based on that the size of the second control information is greater than the size of the pre-configured third control information.

6. The method of claim 5, further comprising:
   receiving the truncated second control information from the base station;
   performing zero padding with a size of the pre-configured field before being truncated for the pre-configured field of the truncated second control information; and
   decoding the pre-configured field of the second control information subjected to the zero padding.

7. The method of claim 5,
   wherein truncation starts from a most significant bit (MSB) of the pre-configured field of the second control information, and
   wherein the pre-configured field is a resource assignment field.

8. A first apparatus for performing wireless communication, the first apparatus comprising:
   one or more memories storing instructions;
   one or more transceivers; and
   one or more processors connected to the one or more memories and the one or more transceivers, wherein the one or more processors execute the instructions to:
   monitor first control information on a first user equipment (UE)-specific search space configured in an active downlink bandwidth part (BWP) related to the first control information; and
   monitor second control information on a second UE-specific search space configured in the active downlink BWP related to the second control information,
   wherein the first control information comprises control information for scheduling a resource related to Uu communication,
   wherein the second control information comprises control information for scheduling performed by the base station for a resource related to sidelink transmission of the first apparatus,
   wherein, based on that a total number of sizes related to the first control information and second control information before zero padding is greater than 4, the second control information includes zero padding,
   wherein a size of the second control information including zero padding is equal to a smallest size among sizes related to the first control information that are larger than the second control information before zero padding, and
   wherein monitoring the first control information and the second control information is based on that the size of the second control information before zero padding is not larger than all sizes related to the first control information.

9. A method for performing wireless communication by a base station, the method comprising:
   performing zero padding to second control information, based on that a total number of sizes related to first control information and the second control information before zero padding is greater than 4;
   transmitting, to a first apparatus, the first control information on a first user equipment (UE)-specific search space configured in an active downlink bandwidth part (BWP) related to the first control information; and transmitting, to the first apparatus, the second control information on a second UE-specific search space configured in the active downlink BWP related to the second control information, wherein the first control information comprises control information for scheduling a resource related to Uu communication, wherein the second control information comprises control information for scheduling performed by the base station for a resource related to sidelink transmission of the first apparatus, wherein the zero padding is performed on the second control information until a size of the second control information equals a smallest size among sizes related to the first control information that are larger than the second control information before zero padding, and wherein the size of the second control information before zero padding is not larger than all sizes related to the first control information.

10. The method of claim 9, wherein the size of the second control information is matched to a size of pre-configured third control information, and wherein the first UE-specific search space related to the first control information overlaps with the second UE-specific search space related to the second control information.

11. The method of claim 10, wherein the pre-configured third control information is the same as the first control information.

12. The method of claim 10, wherein a padding bit is added to the second control information, based on that the size of the second control information is less than the size of the pre-configured third control information.

13. The method of claim 10, wherein a part of a pre-configured field of the second control information is truncated based on that the size of the second control information is greater than the size of the pre-configured third control information.

14. The method of claim 13, further comprising:

transmitting the truncated second control information to the first apparatus, wherein zero padding is performed on the pre-configured field of the truncated second control information by the first apparatus.

15. The method of claim 13, wherein truncation starts from a most significant bit (MSB) of the pre-configured field of the second control information, and wherein the pre-configured field is a resource assignment field.

* * * * *